(12) United States Patent
Moore

(10) Patent No.: US 7,925,985 B2
(45) Date of Patent: Apr. 12, 2011

(54) METHODS AND APPARATUS FOR PROCESS THUMBNAIL VIEW

(75) Inventor: Dennis B. Moore, Hillsborough, CA (US)

(73) Assignee: SAP AG, Walldorf (DE)

( * ) Notice: Subject to any disclaimer, the term of this patent is extended or adjusted under 35 U.S.C. 154(b) by 778 days.

(21) Appl. No.: 11/254,144

(22) Filed: Oct. 18, 2005

(65) Prior Publication Data

US 2007/0038963 A1 Feb. 15, 2007

Related U.S. Application Data

(60) Provisional application No. 60/703,579, filed on Jul. 29, 2005, provisional application No. 60/707,700, filed on Aug. 11, 2005.

(51) Int. Cl.
| | |
|---|---|
| *G06F 3/14* | (2006.01) |
| *G06Q 50/00* | (2006.01) |
| *G06Q 10/00* | (2006.01) |
| *G06Q 99/00* | (2006.01) |

(52) U.S. Cl. ........... 715/772; 705/7; 705/9; 717/104
(58) Field of Classification Search .......... 715/772; 717/704; 705/7, 9
See application file for complete search history.

(56) References Cited

U.S. PATENT DOCUMENTS

| | | | |
|---|---|---|---|
| 5,566,291 A | 10/1996 | Boulton et al. | |
| 6,266,805 B1 * | 7/2001 | Nwana et al. | 717/104 |
| 6,286,137 B1 | 9/2001 | Bleizeffer et al. | |
| 6,442,557 B1 | 8/2002 | Buteau | |
| 6,549,949 B1 | 4/2003 | Bowman-Amuah | |
| 6,854,088 B2 | 2/2005 | Massengale et al. | |
| 6,889,197 B2 | 5/2005 | Lidow | |
| 6,892,192 B1 | 5/2005 | Geddes et al. | |
| 7,155,715 B1 * | 12/2006 | Cui et al. | 717/177 |
| 2001/0028364 A1 | 10/2001 | Fredell et al. | |
| 2002/0059425 A1 | 5/2002 | Belfiore et al. | |
| 2002/0073080 A1 | 6/2002 | Lipkin | |
| 2003/0125929 A1 | 7/2003 | Bergstraesser et al. | |
| 2003/0212586 A1 | 11/2003 | Majd et al. | |
| 2003/0236732 A1 | 12/2003 | Cimral et al. | |
| 2004/0117358 A1 | 6/2004 | von Kaenel et al. | |
| 2004/0187140 A1 | 9/2004 | Aigner et al. | |
| 2004/0220791 A1 | 11/2004 | Lamkin et al. | |

(Continued)

FOREIGN PATENT DOCUMENTS

WO WO0060510 10/2000

OTHER PUBLICATIONS

Kobayashi et al. Systems, Man, and Cybernetics, 1997. 'Computational Cybernetics and Simulation'., 1997 IEEE International Conference on (0-7803-4053-1).*

(Continued)

*Primary Examiner* — William L Bashore
*Assistant Examiner* — Jordany Núñez
(74) *Attorney, Agent, or Firm* — Blakely, Sokoloff, Taylor & Zafman

(57) ABSTRACT

The structure and status of a process are displayed jointly. Multiple visualization mechanisms are used to provide the visualization of business process data. Drill-down of the data provides interactivity for a user to access information. In one embodiment color coding is used to provide a color distribution to visually indicate information to a user regarding a process.

24 Claims, 12 Drawing Sheets

U.S. PATENT DOCUMENTS

2005/0039119 A1 2/2005 Parks et al.
2006/0229922 A1* 10/2006 Levy et al. ..................... 705/7

OTHER PUBLICATIONS

T. Alan Keahey, "Getting Along: Composition of Visualization Paradigms", Visual Insights, Inc., 4 pages.
Andy Cockburn et al., "Design Issues for World Wide Navigation Visualization Tools", New Zealand, 17 pages.
Final Office Action mailed Jul. 17, 2008 for U.S. Appl. No. 11/254,169.
Final Office Action mailed Sep. 18, 2008 for U.S. Appl. No. 11/181,644.
Non-Final Office Action for U.S. Appl. No. 11/181,644 mailed Feb. 19, 2009, Whole document.
Final Office Action mailed Aug. 4, 2009 for U.S. Appl. No. 11/181,644.
Final Office Action for U.S. Appl. No. 11/181,644 mailed Jun. 8, 2010, 16 Pages.
Non-Final Office Action for U.S. Appl. No. 11/181,644 Mailed Dec. 9, 2009, 9 Pages.

* cited by examiner

_US 7,925,985 B2_

METHODS AND APPARATUS FOR PROCESS THUMBNAIL VIEW

RELATED APPLICATION

This application claims the benefit of priority to U.S. Provisional Application No. 60/703,579, filed Jul. 29, 2005, and U.S. Provisional Application No. 60/707,700, filed Aug. 11, 2005.

This application is related to U.S. patent application Ser. No. 11/181,644, entitled "Methods for Enterprise-Level Data and Process Access and Presentation," and filed Jul. 13, 2005, and to U.S. patent application Ser. No. 11/254,169, entitled "Methods and Apparatus for Comparison of Projects," and filed Oct. 18, 2005.

FIELD

Embodiments of the invention relate to displaying data, and more particularly to presenting structure and status of a process together in a user display.

BACKGROUND

The flow of work in an enterprise system is largely influenced by the available methods of access and presentation of enterprise data to the user. The limit on the number of combinations of visualization and access methods of the various types of enterprise data and events can cause inefficiencies in the ability of persons to do their work within an enterprise system. Existing software applications, for example, MICROSOFT OFFICE products, have features that allow users to navigate in the software, and to view and select actions from menus, in order to do their work on a computer.

Different visualization approaches have been used, including a menu, a picture representation of a file (e.g., an icon), etc. These metaphors allow for the presentation of certain data, but have suffered limited usability in terms of providing information regarding particular stages or phases of a process. Other, more complex visualization metaphors, including fish eye views, hyperbolic relatedness browsers, tree diagrams, etc., have been developed to show further complex levels of detail and relationship among data.

However, the visualizations currently available for enterprise applications lack the ability to interact in significant ways with the presented data.

SUMMARY

Methods and apparatus are described for determining a logical order of phases of a process and associating a status icon with each of the phases. The status icons can visually indicate the status of the phase. The phases of the process can be displayed in the logical order to provide a visual representation of the process that indicates both process structure and status.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
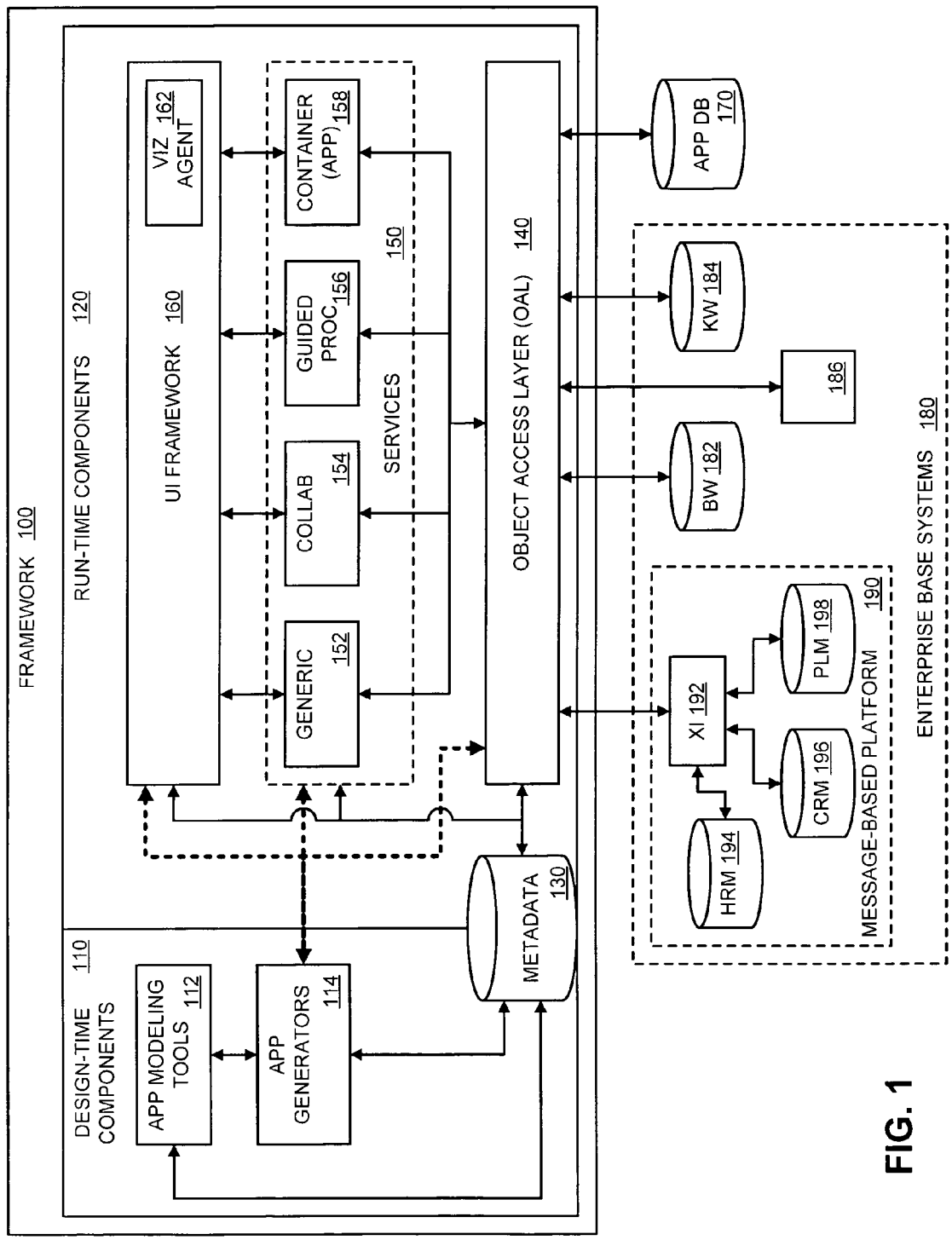
FIG. 1 is a block diagram of an embodiment of a composite application framework with a visualization agent.

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Various discussions below refer to enterprise-level data. Enterprise-level data may include enterprise information and/or processes, and/or other enterprise objects/processes associated with information or processes. Enterprise information and/or processes are to be understood to include any data, process, and/or event that may be available within an enterprise system. In one embodiment the system takes into account permissions associated with a user to determine data to which a user should have access, and/or an amount of data available to an accessing user. The enterprise information or processes may include master data or business objects, which refer generally to management information, project or process coordination data, etc. Process metadata may refer to related or incidental data/metadata or other information that may not be strictly considered part of a process, but provides information or insight into a process, a direction or end result of the process, etc. Smart forms may refer to documents or programs that allow the incorporation of external material. The external material may be from other documents, or be provided interactively with a user. Smart forms can be used to avoid duplication of information already available elsewhere in the enterprise system. Exceptions/alerts may refer to warnings or errors resulting from a process or an action that produce an unexpected or unwanted condition/action. The exception can be generally triggered, for example, by an unrecognized condition, or triggered by a specific condition for which the system watches. Project events may refer to access of a project, which may be a series or group of related or dependent processes, steps, and/or actions, or may refer to something spawned by a process, step, or action of a project. A user may instigate access to the project, or a project action may prompt a user to provide input. A project event may refer to initiating a project step, or providing input or reviewing a step in the project. Collaboration data may refer to information that provides for the comparison and/or synchronization of effort, or the coordination of a process. Help/tips/support information may refer generally to "suggestions," which may be offered as help data, as well as prompts to a user. In the context of the system described herein, the suggestion may be general (e.g., spelling changes), as well as specific to a project on which a user is working (e.g., providing possibilities of specific information pulled from the enterprise that could complete a particular form the user is filling out).

Visualizations may include links to and/or abstractions of enterprise data, including business objects. As used herein, the term "business objects" should be understood to refer to traditional objects, or modeled data objects, information objects, as well as service objects or services in a service-oriented, or service-driven environment. Thus, just as business objects may be mentioned with respect to being associated with data and/or links, in a service-driven system data and/or links may be associated with a service. Thus, any mention of business objects should be understood as including reference to enterprise services. As used herein, business processes, or simply processes, may refer to the service objects and/or services of a service-oriented or service-driven environment.

In accessing and presenting enterprise information/processes, a system may take into account personal preferences, work context, and working mode. The personal preferences can allow a user to select from among various different working modes or work contexts in which to have information presented. The working mode can be one of many different possible modes, for example, exploration operation mode, search operation mode, detailed work and decision making operation mode, process analysis operation mode, and reporting mode. The enterprise information or processes accessed and presented can be any of a number of different data and/or events, for example, master data or business objects, process metadata, smart forms, exceptions/alerts, project events, collaboration data, and/or help/tips/support information. The accessing or navigating to information or processes may be implemented with different linking or navigation mechanisms/methods, for example, an action panel, a smart tag, an object link, a menu item, a right-button mouse click, and/or a push event. The presenting of the information may be implemented with different visualizations, for example, fish eye view, tabular view, chart form, relationship diagram, semantic network, project cockpit view, and/or with presenting relevant information via an automated voice method. The different implementations, visualizations, modes, and events/data can be combined in any combination to render a many permutations.

Enterprise data may be accessed via one or more navigation methods, which can include many different mechanisms for accessing or affecting data. In one embodiment the navigation methods can be considered to be activated or triggered. Activation or triggering of a navigation method may occur by a user selecting the particular mechanism (e.g., performing a mouse-over, clicking on a menu item, etc.). The activation or triggering prompts the system to enable the action associated with the navigation mechanism or method. As to some specific types of navigation, an action panel may refer to a list of action options displayed within a tab or a screen. The action panel may refer to options available to the user for performing specific functions or engaging in specific processes or providing specific information. A smart tag may refer to an XML (extensible markup language) embedded "tag" within a document. The smart tag may recognize words, sets of words, application programs, databases, etc., and provide a service or function when a recognized combination is found. For example, the smart tag may bring up a series of documents, begin an application, link to a database, launch a website, charge a purchase to an account or credit card number, append version related information to an edited document, etc. A smart tag can link together back end systems to enable a user to work, in one application, with live data from various sources, as provided herein. An object link may refer to an embedded trigger within a document or a program to provide a link to another item (e.g., a process, a data element), which may have particular characteristics that are related or similar. A menu item may refer to an item in a program, for example, a drop-down menu. A menu item may be considered to be similar to an action panel, and an object link may be considered to be similar to a smart tag. A right-button mouse click may refer to a resulting menu or selection from activating a secondary, utility button on a mouse. Note that most mice that include two or more buttons default to having the left button provide selection, and the right button to provide alternative functions or utilities (e.g., bringing up a menu). Many mice allow for the right and left button functionality to be swapped. Many mice also include a third, generally, middle button, which may provide additional features to a user. The expression "right-button mouse click" will be used generically herein to refer to the triggering of a utility button, and is not to be viewed as limiting. A push event may refer to a prompt or an action brought up for a user that may not be directly instigated by the user. As one example, an entity or process outside the context of the program in which the user is working may cause a prompt to be presented to the user.

The data may be presented in many different forms, which may or may not be native to the program in which the user is operating. For example, a program may present information in a particular form, and the same form of presentation or another may be provided in which to present data to the user. A fish eye view may refer to a presentation of information where details of data or processes are shown for elements close in layout or close in relatedness to information being browsed or worked on by a user. For example, in an EXCEL spreadsheet, when a user is viewing a particular cell, cells within close proximity, or cells with related data may be highlighted or show specific details, while other cells may not. In another example, a software program or working environment may have multiple panels or panes of information, and when a user is working within a particular panel, close panels may display detailed information, which more distant panels may simply show a title or subject heading. A tabular view may refer to the display of information in tables, or lists of data. A chart form may refer to various types of information display, for example, a pie chart, a bar graph, a graphical representation, or other form of chart. A chart is well suited for showing how data compares to other data. A relationship diagram may refer to a diagram or visual representation that shows relatedness and/or interaction between processes or data. The visual representation may include block or flow diagrams, and may show directly how elements are related. A semantic network may refer to a graphic representation of knowledge in patterns of interconnected nodes and arcs. A semantic network may show clusters of information and may provide information as to how a node is related to another node. A project cockpit view may refer to a project-driven display having the main tasks, processes, steps, aspects, of a project in a single view. Details may be available upon drilling down into a particular section of the "big-picture" display. Automated voice may provide a method of providing information through the playing of recordings, or through the software "reading aloud" information by generating an audible presentation of the data.

In one embodiment the method of data presentation is determined by an intelligent process that can take into account other information. Thus, different users may be presented the same information with different presentation methods, for example, based on how the data is anticipated to be used by the particular user. The determination of a presentation paradigm can be performed at runtime of a software program, and can take into account the working mode of the user. In one embodiment the working mode is classified depending on an active work context derived from the office or other work environment (e.g., document type, document content, program type, user identity). In one embodiment the working mode classification allows the system to provide different amounts of relatedness data to a user. For example, a user's preferences may indicate that the user desires to seek broad amounts of related information, which may cause the system to provide a different combination of navigation and visualization methods than if the user were seeking narrow amounts of relatedness data.

In one embodiment a presentation paradigm is tagged or associated with a particular working mode, for example, if a particular visualization paradigm is well-suited to a particular working mode. The system can offer a personalization dialogue to the user to allow the user to choose a working mode, and/or change a working mode from an active working mode. Based on the working mode, the user can allow the system to automatically select a particular presentation paradigm, based on the working mode associations.

Combinations of presentation paradigms and navigation methods as described herein can provide for viewing data contextually relevant to content written on productivity documents, such as documents of an office software program (e.g., MICROSOFT OFFICE of Microsoft Corporation of Redmond, Wash., LOTUS NOTES of International Business Machines (IBM) Corporation of Armonk, N.Y., OPENOFFICE of the OpenOffice.org open source project, STAROFFICE of SUN Microsystems, Inc. of Santa Clara, Calif.). The data that is contextually relevant could come from ERP master data and/or other sources. The combinations of visual representations and navigational methods can allow working with known data information from ongoing processes and projects, as well as master data information (e.g., purchasing orders, employee human resources (HR) information, product inventory, etc.). The data can be used in real time on productivity suite documents to better enable a user to perform important tasks. Thus, in one embodiment the data can be accessed and used without having to switch working environments from one software program to another, but accessed all within a particular software program context. The visualization and navigational combinations may also enable a system to provide a user the ability to work with contextual data information types, including master data in ERP systems and events.

In one embodiment data is viewed from a business transaction or process in a manner that reflects a relationship defined in the master data of an enterprise system. Thus, a user can interact with process management systems in a contextual way, while performing work with office suite productivity tools. For example, in MICROSOFT EXCEL allows the use of smart tags, menu items, and an action column on the right. With the combinations defined herein, a user could have access to visualize potentially all information about a project, such as assigned employees, budget, decisions that were made, back-end accounting data, etc., and all in the context of the EXCEL document the user is working upon. The user could thus also refer to content written inside the information documents.

In one embodiment a user (e.g., program manager, project manager) can click on one program band or on one project bar graph, to switch views. The click action opens the view to a progressive disclosure, or a tiered visualization, of a series of menus and choices for exploring further data related to the program or projects. Alternatively the user can access data by using a hyperbolic relatedness browser from a smart tag. In another alternative the user can "mouse-over" a bar graph or a project band, to obtain the underlying data. In another alternative the user click action can render a fish eye visualization to view phases of a project and categorize what work a particular phase requires. The work a phase requires can be, for example, assignments to people who do certain tasks, documents required for certain phases, and so forth.

In general, a visualization mechanism can be provided to enable a progressive disclosure of process status information. As discussed above, a process can be accessed from enterprise data. The process may have various phases, which may represent the work associated with the process. The expression phases may be used herein to represent various subparts or subprocesses of a process. Other terms may be used to impart a similar understanding, for example, a stage, an event, etc. Phase, stage, and/or event may refer to different elements of a process. A phase may itself have several associated events or actions, which may represent the work to be completed for the particular phase. The status of a process and/or status of a particular phase can indicate a level of completion of work associated with the process and/or the phase. The completion or termination of particular events, activities, and/or actions of a process or phase could simply require the performance of a task. In one embodiment a task may require another task to be completed first, or an issue to be resolved prior to performance of the task. Thus, a task may require a threshold task to be completed, such as an enabling task, or resolution of an error or a warning associated with a task. The status may also be referred to as the state of a process.

A process or project may have one or more manners in which the various phases can be organized, for example, as governed by a business plan. The overall business plan may represent the structure, logical order, or organization of the phases of a process or project. The term structure will be used herein to represent any type of ordering including chronological or other logical ordering, organization, etc., of the phases of a process or project.

A visualization can be generated that presents thumbnail representations of a process state, displaying structure and status at the same time. The visualization can provide to a user a progressive disclosure of various data related to process status information within a particular process. The visualization can be considered an overview of a process, displaying structure and status at one time, meaning simultaneously or substantially simultaneously. At the same time may refer to providing a display of multiple items within a single visualization window on a user display. In one embodiment the visualization includes color coded visualizations for rapid determination of overall process state. In one embodiment the visualization presents a drill-down method, for quick access to further, or more detailed, information. In one embodiment multiple processes are displayed together, or at the same time, providing comparison of the various aspects of multiple processes. Thus, a user may be enabled to quickly visually inspect and compare both the processes and actual execution states of processes. Rapid color-distribution comparisons can be made when glancing at a thumbnail view according to what is described below.

As used herein, thumbnail may refer to a one or more visual elements used to provide a representation or abstraction of information. For example, a thumbnail may refer to text and/or graphical representations. A thumbnail may also be referred to as an icon, for example, a phase status icon, or simply status icon. A thumbnail can also be used in one embodiment to represent a process, providing a process status icon, for example.

The thumbnail visualization displays a collection of real time process structure and status information together. In one embodiment an array of information regarding multiple processes can be displayed together. The thumbnail visualization may provide a drill down system, using any of the mechanisms discussed above, which may enable a user to access further information, and/or link to particular tasks. The thumbnail visualization as described herein provides navigation, configurative perception of status, and comparison of structure not previously available. Some earlier methods offered some minor drill down functionality and/or a zoom feature to look in more detail at a particular representation. However, earlier methods have not provided users the ability to access a progressive disclosure of actual process status information, and the zoom features were limited to size of a representation, not the display of additional details.

The thumbnail visualizations can allow a user to view, monitor, and/or analyze one or more currently running or executing processes, as well as allow for planning and development of other processes. The thumbnail visualization may further enable software presentation of raw process data found in relational databases, in a way that allows the user can better interpret and utilize the data. The thumbnail visualization provides a minimized representation that functions as a link to one or more larger instances, and provides some minimized view of an actual instance to which the thumbnail links. Each thumbnail can include status indicators that provide aggregated information of pending work. Process thumbnails not only provide status information, but information about the actual structure of the project instance.

FIG. 1 is a block diagram of an embodiment of a composite application framework with a visualization agent. In general, framework 100 leverages and enhances underlying enterprise base systems 180, which could include one or more of a knowledge management warehouse (KW), a business (intelligence) warehouse (BW), an exchange interface (XI), supporting business transaction systems (e.g., customer relationship management (CRM), human resources management (HRM), product life-cycle management (PLM)), etc., with tools, content, and guidelines to provide a foundation for developing and executing composite applications.

Composite applications typically implement new or additional processes in an existing IT landscape, as opposed to the core transactional processes. Composite applications may also support semi-structured processes, handle event-driven and knowledge-based business scenarios, and/or support collaboration in teams. In one embodiment composite applications may support the JAVA stack. The composite applications may be broken down into various portions, each of which may be separately generated/modeled. The composite application portions may, in one implementation, be implemented as Enterprise Java Beans (EJBs), and in other implementations, the design-time components may have the ability to generate the run-time implementation into different platforms, such as J2EE, ABAP, or NET.

Framework 100 may provide modeling and configuration tools (e.g., business object modelers, guided procedures), generic components (e.g., user interface (UI) patterns, generic services (functional key actions, help, authorizations)), standardized interfaces (e.g., object access layer), reusable content (e.g., predefined object models, XI content), and/or integration infrastructure (e.g., provide connections to business objects and/or documents, provide access to XI proxies). Framework 100 allows composite applications to be created according to guidelines, or documentation that allows composite applications to be created in a controlled and/or predictable manner. The guidelines may or may not be implemented in software.

Framework 100 may be implemented using readily available technology. For example, framework 100 could be implemented using mySAP technology components. In one embodiment the components may include an SAP WEB APPLICATION SEVER (WAS) to run applications, an SAP ENTERPRISE PORTAL to render applications, an SAP KW to handle unstructured information sources, an SAP BW to provide reporting and analytics, data mining, and planning and simulation, SAP BUSINESS PROCESS MANAGEMENT (BPM), an SAP Exchange Infrastructure (XI) to provide shared integration knowledge separate from applications, and/or SAP WEB SERVICES to offer business functionality over the Internet.

For instance, an SAP WAS may include a J2EE engine, SAP IDE, Universal Workflow, and Deployment Service. The WAS may also include a pattern-based and freestyle-based user interface development and interface module. Also, an SAP ENTERPRISE PORTAL may provide unified access to applications, information, and services by using views, roles, pages, worksets, top-level navigation, and KM. This enterprise portal also provides login management and user management. For KM, unstructured information consists of collaboration and content management. For collaboration, KM enables team-driven business processes, synchronous and asynchronous applications, groupware integration, calendars, bulletin boards, threaded discussions, and collaboration rooms. For content management, KM handles documents, feedback, rating, publishing, subscription, document workflow, versioning, archiving, indexing, searching, and taxonomies. SAP BPM may cover life cycles (e.g., design, development, deployment, and change). An SAP XI may provide external and internal integration of system and connectors to various systems such as ORACLE, SIEBEL, PEOPLESOFT, and/or SAP. The SAP XI may be based on Web services, JAVA, and XML standards. SAP Web services may provide a service provider, service handler, and service user. Additionally, an SAP BW may be used.

In one embodiment the KM and collaboration functionality may be embedded in applications, rather than, or in addition to being found in separate pages in the portal. Framework 100 supports development with any of a number of general development environments, for example, JAVA, with EJB (Enterprise JAVA Beans) 2.0, JDO (JAVA Data Objects), JAVA persistency, and/or JAVA application logic, Advanced Business Application Programming (ABAP), and Web services. Existing ABAP components may be integrated via JAVA connector calls. In one embodiment the complete JAVA stack could be used. Furthermore, Web service technology may be used for remote access.

In general, framework 100 allows composite applications to work with existing system landscapes, because framework 100 can decouple composite applications from the underlying enterprise platform. Decoupling may involve providing communication to back-end systems via a central interface and providing a back-end-independent object model. Providing a back-end-independent object model may be implemented to allow data from the source systems to be transformed into a unified structure. Transforming the data into a unified structure can further allow successive installation, activation, and use of different applications, which may reduce entry costs. Additionally, framework 100 facilitates highly efficient development of composite applications. Development of composite applications can be accomplished by model-driven composition of applications, service-oriented architecture, UI and application patterns, reusable object models, and methodologies. Thus, framework 100 could be viewed as a kind of application factory, which enables application building in part or in whole without programming.

Examples of the types of business processes supported by framework 100 include enterprise change management, product innovation, employee productivity, and enterprise service automation. Enterprise change management may support enterprises when merging, splitting, acquiring, spinning off, or reorganizing. Product innovation may support the life cycle of a product, including the preproduction phase(s) of collecting ideas and consolidating them into concepts, the market launch phase, and the end of life. In dealing with the life cycles of a product, the resources of a PLM and CRM may be drawn upon. Employee productivity aims to increase employee productivity, decrease costs, and increase employee satisfaction. Key functions may include manager self services, employee self services, expert finders, e-procurement, and e-learning. Enterprise resource management (ERM) and business to employee (B2E) resources may be drawn upon to accomplish these tasks. Enterprise service automation provides administration and monitoring functions as well as evaluation tools to facilitate project success, for example, as in the case of setting up a project and staffing the project with people having the required skills and availability to accomplish the project. Additional application families may also be created.

Framework 100 may also provide external services in a shared object environment, for example, by providing a uniform object access layer and service layer that bundle functionality across service components. Furthermore, a transparent mapping may be provided from the application's perspective. Thus, the application built on the framework would not have to know whether certain services are provided by a portal, by a KW, by a WAS, or other external service.

Framework 100 includes design-time components 110, run-time components 120, and metadata repository 130, which is shared by the design-time components and the run-time components. Metadata repository 130 represents an abstraction of one or more data and/or access/service resources design-time components 110 and run-time components 120 may draw on, and is not necessarily to be understood as a resource within one of the components, or available only to the components. In general, design-time components 110 are responsible for developing composite applications that are executed by run-time components 120.

Design-time components 110 provide a repository and user interface for modeling and generating business objects, business services, business processes, user interfaces, and/or other aspects/components of a composite application. A business object may be, for example, an employee, a product, a plant, or any other semantic representation of a real-world entity. A business service is an action taken on a business object. Changing the price or category of a product are examples of services for a business object that represents a product. As another example, gathering input from employees and customers (who may themselves be represented by business objects) for a new product idea could be considered a business service. Combining business services to allow the services to operate together, in sequence and/or in parallel or otherwise in conjunction, produces a business process. A composite application may include any number or combination of business objects, business services, and/or business processes.

Design-time components 110 include application modeling tools 112 and application generators 114. Design-time components 110 may draw on information from metadata repository 130. Modeling tools 112 represents one or more tools that may be used for modeling business objects, business services, business processes, user interfaces, etc. A separate modeling tool may be used for each portion/component/segment of a composite application. Additionally, a single modeling tool could provide functionality for multiple portions of the composite application. Furthermore, modeling tools 112 may be used for integrating business objects, business services, business processes, user interfaces, etc. Thus, framework 100 may support model-driven composition of composite applications, allowing for development with little or no programming effort.

In one embodiment application generators 114 allow template-based generation of JAVA-coding, database tables, entries in metadata repository 130, XML configuration files, etc. The template-based generation of information may be implemented with extensibility and the ability to conduct upgrades without loosing his information. The ability to implement with extensibility and upgradeability can be achieved by allowing the metadata of the new implementation to be compared with the metadata of the existing implementation during an upgrade. If there are implementation-specific extensions, they may be identified, and strategies for solution of possible conflicts may be proposed.

Metadata repository 130 can include metadata about business objects, business services, business processes, and/or other application portions for use in modeling and/or executing the application portions. Thus, an application portion may be modeled, as well as the origin of the data, whether in a local database, remote database, or a combination of the two. In one embodiment the content of metadata repository 130 includes information extending beyond a specific implementation of an application portion. There could be repositories that describe a specific implementation, which may be filled from a more general repository. Metadata repository 130 can be understood as including a general, a specific, or a combination of repository information.

The metadata can enable generic services like automatic generation of default UIs, object access interface, data access methods, persistency, and mappings. Metadata repository 130 stores the content of the composite application (e.g., specific business objects, information about services, and, eventually, processes) and makes the metadata information available at run-time (if needed). Metadata repository 130 may allow different metamodels to be created (the model for business objects being one of them) and to persist the metadata. For specific purposes, additional repositories, such as, for example, a portal content directory (PCD), which may contain portal specific pieces of an application (e.g., views, pages, roles), may be required.

Application generators 114 generate source/executable code from the application portions modeled by modeling tools 112. Application generators 114 may include and/or use templates to generate the code. One or more templates may be stored, for example, in metadata repository 130. In one embodiment application generators 114 are driven by the metadata in metadata repository 130 to automatically create JAVA classes (e.g., for use in run-time components 120) and/or configuration files (e.g., to adjust user interface (UI) patterns to a certain business object). Thus, the connectivity to back-end systems and the application persistency may be generated, as well as a default user interface. Application generators 114 may also generate interfaces for application services, data access logic, and persistency.

Run-time components 120 provide the run-time environment for business objects, business services, business processes, user interfaces, etc., as well as data access abstraction. Run-time components 120 may include object access layer (OAL) 140, service layer 150, and a UI layer including UI framework 160 and visualization (viz) agent 162. Run-time components may draw upon the resources of metadata repository 130. In one embodiment run-time components 120 also use application database 170, which may store additional information for executing the composite applications. For example, application database 170 may store data tables for executing applications.

OAL 140 manages interaction between composite applications and enterprise base systems 180, and can provide a uniform interface for composite applications to enterprise base systems 180. Thus, OAL 140 can reduce the knowledge needed for a composite application developer about the source of data because OAL 140 sits on top of, and embraces different connectivity technologies. OAL 140 may act as a dispatcher to provide access to a variety of data sources. OAL 140 may leverage message-based platform 190, which may include XI 192 with connectivity to underlying applications. The underlying applications can include one or more of HRM 194, CRM 196, or PLM 198. OAL 140 can also leverage business intelligence warehouse (BW) 182 and/or knowledge management warehouse (KW) 184. In general OAL 140 provide connectivity to any underlying application/service, or enterprise base system, and may include some other application or service 186 not specifically described herein.

OAL 140 may also leverage a fairly synchronous infrastructure such as a service-oriented data access, which could be a BW, and a KW repository framework, which may allow connection to document management systems or to LDAP (Lightweight Directory Access Protocol), a more unstructured type of data. Thus, OAL 140 may bring structured and unstructured data closer together.

Coding and configuration data for OAL 140 may be automatically generated, at least in part, by business object metadata in repository 130. Furthermore, OAL 140 allows for local persistency (e.g., connectivity to a local database such as application database 170 to store data). Data synchronization and replication of remote data (e.g., data in back-end systems) into the local persistency database may be supported. For an application sitting on top of OAL layer 140, the source of the data may be completely transparent, which may assist in keeping application logic stable since the application is, at least for the most part, not affected by underlying systems. In one embodiment OAL 140 includes extensions to document management or content management that allow business objects to use the functionality for documents.

In one embodiment OAL 140 includes extensions to document management or content management that allow business objects to use the functionality for documents. For example, taxonomies for business objects, transparent indexing of TREX for structured and unstructured objects, and subscription services for dependent objects independent of the repository where the objects reside may be provided. OAL 140 may also provide transaction support, in as far as the transaction concept is also supported by concerned source systems, a metadata interface, allowing an application to be dynamically configured at run-time, and subscription services (e.g., J2EE publish and subscribe).

OAL 140 may have a variety of features, for example, by making the origin of data transparent to the application logic and UI to keep the application logic and UI stable. Thus, there may be little to no impact of the underlying information technology (IT) system landscape on the application logic or UI, because OAL 140 handles adaptation to the specific landscape. Furthermore, the abstraction provided by OAL 140 can prevent changes to enterprise base systems 180, such as KW and XI, from having a direct influence on the application logic or the UI. Thus, the underlying functionality may be changed without affecting the application logic or overall user interface experience.

Additionally, OAL 140 may accelerate composite application development. In one embodiment business objects are reused across composite applications, avoiding redevelopment of functions already developed, and potentially avoiding the need to port to a new environment. Example of reuse and development acceleration may include reusing enterprise base systems 180 access services (e.g., KW, XI) across composite applications, reusing know-how (e.g., uniform interface structure providing common access to business objects), efficient (e.g., model-driven) implementation of business objects based on a repository, and/or using a relative homogenous structure for application logic, which simplifies modifications and maintenance.

Additionally, OAL 140 may enable integration. Integration may be facilitated by communication between composite applications via a shared object model, shared contexts across composite applications based on a shared object model, and integration of enterprise base system (e.g., KW and BW) via a composite application object model. The integration may also involve integrating business objects.

Additionally, OAL 140 may facilitate application building by configuration. Application building by configuration can be accomplished by providing standard interfaces with well-defined semantics, which allows components to be combined in a meaningful way since the semantics of the components' interfaces is known, and allowing objects to participate in a collaborative context, (e.g., chat room) just by implementing certain interfaces.

Service layer 150 provides services for business objects in OAL 140. In general, services for business objects are common procedures that users need to interact effectively with the objects. Service layer 150, for example, may include generic services 152, collaboration services 154, guided procedure services 156, a container for application services 158, and/or other services not depicted in FIG. 1. Thus, a service layer 150 may be more or less complex than what is shown, and may include multiples of a particular type of service, and other services not shown. By separating the services from the business objects, the services may be more readily reused across business objects. In one embodiment service layer 150 provides integration of external services.

Generic services 152 provide one or more standard services for parts of an application. A standard service may refer to traditional services, as well as services that are useful to more than one application. Generic services 152 may also provide namespace and packaging concepts. Generic services 152 are typically not bound to a portion of an application, but are available to all portions. Examples of generic services 152 include print services, value help services, authorization, personalization, and voice enablement. An example of a value help service is the filling of drop down boxes in user interfaces; the service is able to determine what the possible entries are for boxes and to populate the boxes therewith.

Collaboration services 154 represent one or more services to provide the ability to link semantic objects to business objects. Semantic objects typically provide a set of generic services, like classification, notification, subscription, feedback, search, retrieval, rating, time-based publishing, state-based publishing, and security model. In addition, relations between semantic objects may be supported. For example, a team could be assigned to a task, and people could be assigned to the team. Moreover, a room could be created for the task, to keep people and documents together. Semantic objects such as document, folder, room, task, meeting, user, and discussion may be accessible via OAL 140. Semantic objects may also be available in a variety of other ways. For example, semantic objects may be included in OAL 140 as business objects and/or service, and/or individual services of semantic objects may be included in service layer 150.

Collaboration services 154 extend the semantic object concept by making the functionality of semantic objects available for business objects (e.g., notification, subscription, etc.). Thus, collaboration services 154 provides collaboration context for a business object. Collaboration services 154 may automatically manage the relations between business objects and semantic objects. In addition, new kinds of relations may be supported: for example, relations between business objects and semantic objects. Thus, a task or a team may be assigned to a specific product, people may be assigned to the task, and so on. Furthermore, special collaborative services may be provided for semantic objects, such as scheduling and assignment functions for tasks and inviting, splitting, and closing functions for discussions. In particular implementations, a suite of collaboration services may be provided without the need to deal with KM specific. These services may also be made available for composition applications. Furthermore, the relation between the business objects and the semantic objects may be maintained. The collaboration provided by collaboration services 154 may be semi-structured processes. A common understanding of a business process may be reflected by a predefined collaboration scenario. On the other hand, the business process may be adaptable to different enterprise's needs. To support this, differing scenarios may be built with minimal programming.

Guided procedure services 156 allow business objects to participate in guided procedures. A guided procedure is a series of steps, which may involve human interaction and can be performed during the execution of a composite application. A guided procedure may be considered to be a type of workflow. A guided procedure may be common to a variety of applications and, thus, may be reused. To provide guided procedures, guided procedure services 156 may provide pre-defined building blocks for process workflow and pre-defined actions. Additionally, guided procedure services 156 may facilitate template design. This may be used to support role-based collaborative processes, process workflow, and/or context definition. At run-time, guided procedures may be implemented by using template instantiation, by design-time integration for ad hoc adaptation of templates, and procedural navigation and integration in a Universal Worklist (UWL). Furthermore, guided procedure services 156 may provide context awareness and sharing by context mapping of building blocks, business object integration, and user assistance. Additionally, guided procedure services 156 may provide monitoring and analysis of guided procedures.

Application services container 158 can be used to implement model specific services for one or more business applications. Although generic objects, generic services, and/or processes may be generated for an application, some business logic is too specific to be implemented generically. For example, determining the number of vacation days that an employee has may involve determining the number of vacation days the employee is entitled to per year, determining the number of days available based on the employee's service to date for the year, determining how many days the employee has been absent to date for the year, and determining whether to assign those days to vacation days or sick days. Furthermore, if the employee is splitting time between departments, an allocation may need to be made between the two. As another example, an order process at a manufacturer may include obtaining an order, splitting the order into components based on the bill of materials, determining whether each component is in stock, if a component is not in stock, determining where and/or how to procure it, and, if a component must be procured, determining a potential delivery date. The business logic for such tasks may be difficult to model generically, especially across a wide variety of industries. Thus, the logic may be specifically coded to the specific task(s). Container for application services 158 provides one or more interfaces for the task-specific code to be used. The interfaces may be generated by the metadata of the service model, with the inner code individually or specifically programmed for the particular task. Also, maintaining the service definition in the design-time allows generation of an empty service.

The UI layer includes UI framework 160 and visualization agent 162, which will be discussed briefly here, and in more detail below. UI framework 160 provides user interfaces that allow a user to interact with composite applications. In particular implementations, UI framework 160 provides pattern components, such as, for example, a dashboard, a search bar, a browse and collect function, an object editor, and phases for a guided procedure, as building blocks for user interfaces. UI framework 160 may also decouple application logic from the UI, for example, by having a separation of the business objects of OAL 140 and application services of services layer 150, from the user interface elements of UI framework 160. The separation or decoupling can provide for the reuse of UI components in different application contexts. The decoupling can also enable business objects and application services to be visualized differently according to the specific equipments of a certain use case.

In one embodiment UI framework includes visualization agent 162 to provide visualization and/or other presentation of data/information and/or service options to a user. Visualization agent 162 may generally be described as providing the combinations of various presentation methods based upon the various navigation, working context, and/or data types, as described above. Additionally, visualization agent 162 may provide services to enable the presentation of thumbnail representations of various business processes, including structure and status of the processes. In one embodiment the thumbnail representations further include mechanisms to allow drilling down to additional information related to the process, and/or the process itself.

UI framework 160 may also leverage the metadata information on business objects and services through metadata-driven UI-generation and configuration. The metadata approach allows for ready adaptability to alternative screens depending on the end users needs (e.g., in different industries). UI framework 160 may additionally allow integration (e.g., binding) into OAL 140 to access business objects, business services, and metadata. Thus, UI components may be connected to business objects or other base systems through OAL 140. UI framework 160 may support any appropriate type of user interfaces, such as, for example, a user interface composed of pattern-based components and/or freestyle components with interfaces to the user interface components or JAVA SERVER PAGES (JSPs) from SUN JAVA SERVER PAGES (JSPs) available from SUN MICROSYSTEMS, INC., of Santa Clara, Calif. UI framework 160 may also support a JAVA front-end and ABAP back-end, a JAVA front-end and JAVA back-end, or any other appropriate combination of front-end and back-end. The framework may additionally provide a construction kit for complex components and applications and configuration of patterns via XML, URL, or other appropriate technique.

Framework 100 may be connected to application database 170, which may provide a central repository for available business objects. An example of data in application database 170 includes database tables for a business object. The data may be added to, changed, and/or deleted. Data may also be stored in KW, BW, or an XI system. As discussed, framework 200 provides a set of standard services that enables application developers to make use of the data. The origin of the data and/or its persistency may be transparent to the application developer, not to mention the composite application.

Figure 2:
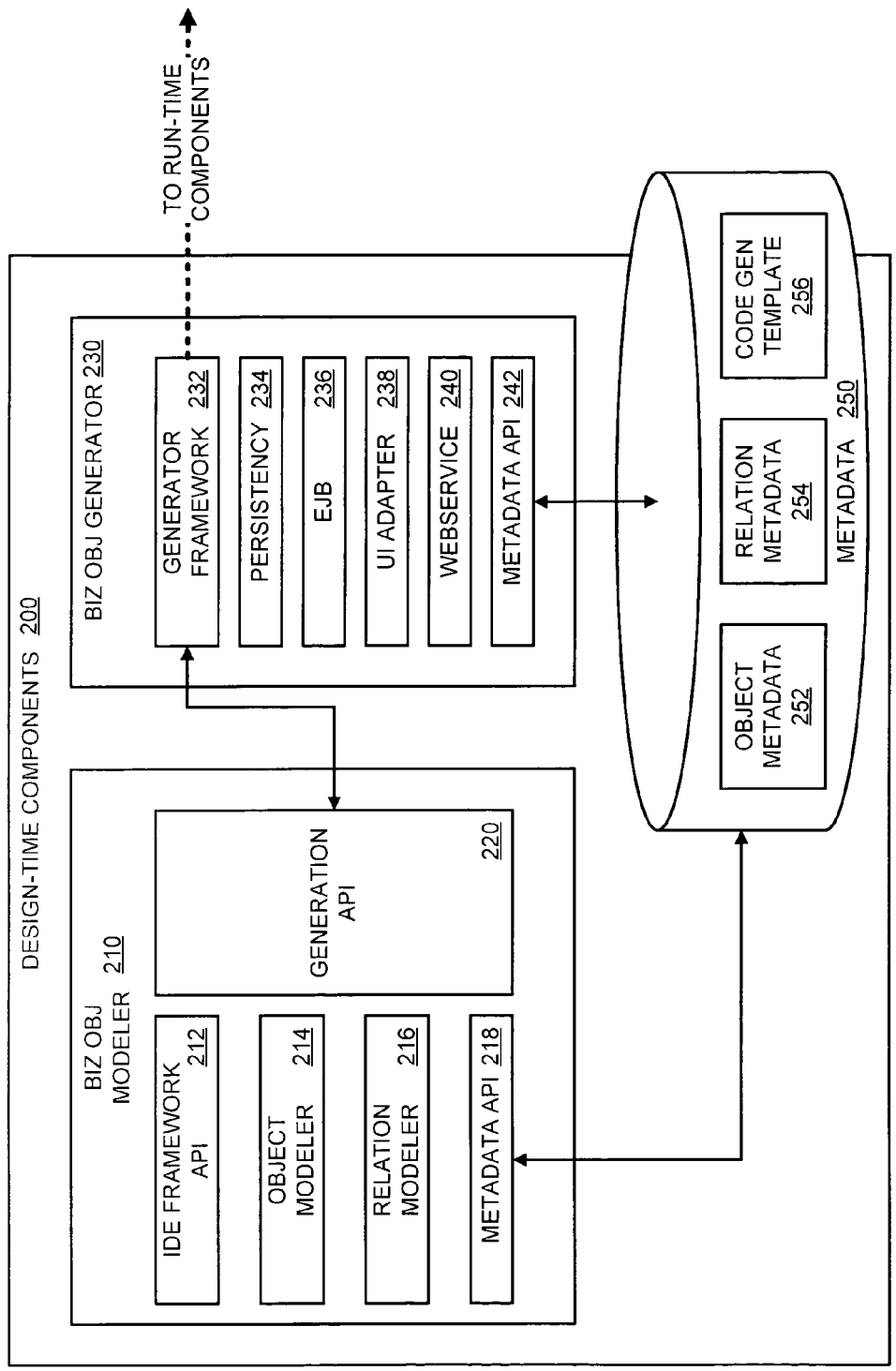
FIG. 2 is a block diagram of an embodiment of design-time components of a composite application framework.

FIG. 2 is a block diagram of an embodiment of design-time components of a composite application framework. Design-time components 200 provide one example of design-time components 110 of FIG. 1. Design time components 200 include business object modeler 210, business object generator 230, and metadata repository 250. Metadata repository 250 can also be considered, at least in part, a run-time component.

Business object modeler 210 may include various components, for example, Integrated Development Environment (IDE) framework application program interface (API) 212, object modeler 214, relation modeler 216, and metadata API 218 to access metadata repository 250. Fewer components than what are shown may be included in one embodiment of the invention, and more complex variations are also possible, including components not necessarily shown. IDE framework API 212 allows object modeler 214 to be integrated into an IDE (e.g., an ECLIPSE IDE), which supports the modeling of the business object by object modeler 214. For example, the integration may support generation of business objects as EJBs, interfaces for application services, default user interfaces, data access logic, and persistency. Relation modeler 216 allows the modeling of relations between modeled objects. For example, a sales order could consist of a customer, a product, and a price. Relation modeler 216, therefore, could provide for the modeling of the relations between these items. In operation, for instance, if a user interface is generated for a sales order, the semantics for each field in the sales order may be identified. Additionally, a connection to the value help function may be facilitated. Metadata API 218 enables business object modeler 210 to store and access business object metadata in metadata repository 250 and relation modeler 216 to store and access business object relation metadata in metadata repository 250.

Business object modeler 210 also includes generation API 220, which allows a business object to communicate with generator framework 232 for code generation, and providing the generated code to a run-time environment.

Business object generator 230 can include generator framework 232, persistency generator 234, EJB 236 generator, UI adapter generator 238, Web service generator 240, and metadata API 242. Generator framework 232 may also be integrated into the IDE accessed through IDE framework API 212.

To generate a business object, business object generator 230 may use templates in metadata repository 250 and code them with object metadata and relation metadata in the repository. Business object generator 230 may also generate the data persistency for the business object, and generate the actual business object (e.g., an EJB). Business object generator 230 may additionally generate user interfaces for the business object and any necessary Web services. Templates used by business object generator 230 may be generic. In one embodiment the various generation components automatically create JAVA classes (e.g., for the implementation of the object access layer), JDO tables, EJBs, and configuration files, to adjust UI patterns to a certain business object, for example. Thus, the connectivity to back-end systems and the composite application persistency is generated as well as a default User Interface. Furthermore, UI adapters for a UI development and interface module and, if necessary, Web services may be generated. The output of such a process may be real working code in the object access layer of the run-time components.

In one example, business object generator 230 generates a run-time implementation of a business object in an object access layer. Business object generator 230 reads the business object metadata from metadata repository 250 and generates JDO persistency, connectivity to an XI, a KW and/or a BW (e.g., by using proxies), generates generic methods, and a basic UI. For this coding, templates (e.g., for services) or XML-templates (e.g., for JDO persistency) are used where business object specific coding or XML is added, and the result is stored as complete code or complete XML.

Metadata repository 250 may include various items of data, including, but not limited to, object metadata 252, relation metadata 254, and code generation templates 256. The information in object metadata 252 and relation metadata 254 may be used to code templates 256 to generate a business object.

Figure 3:
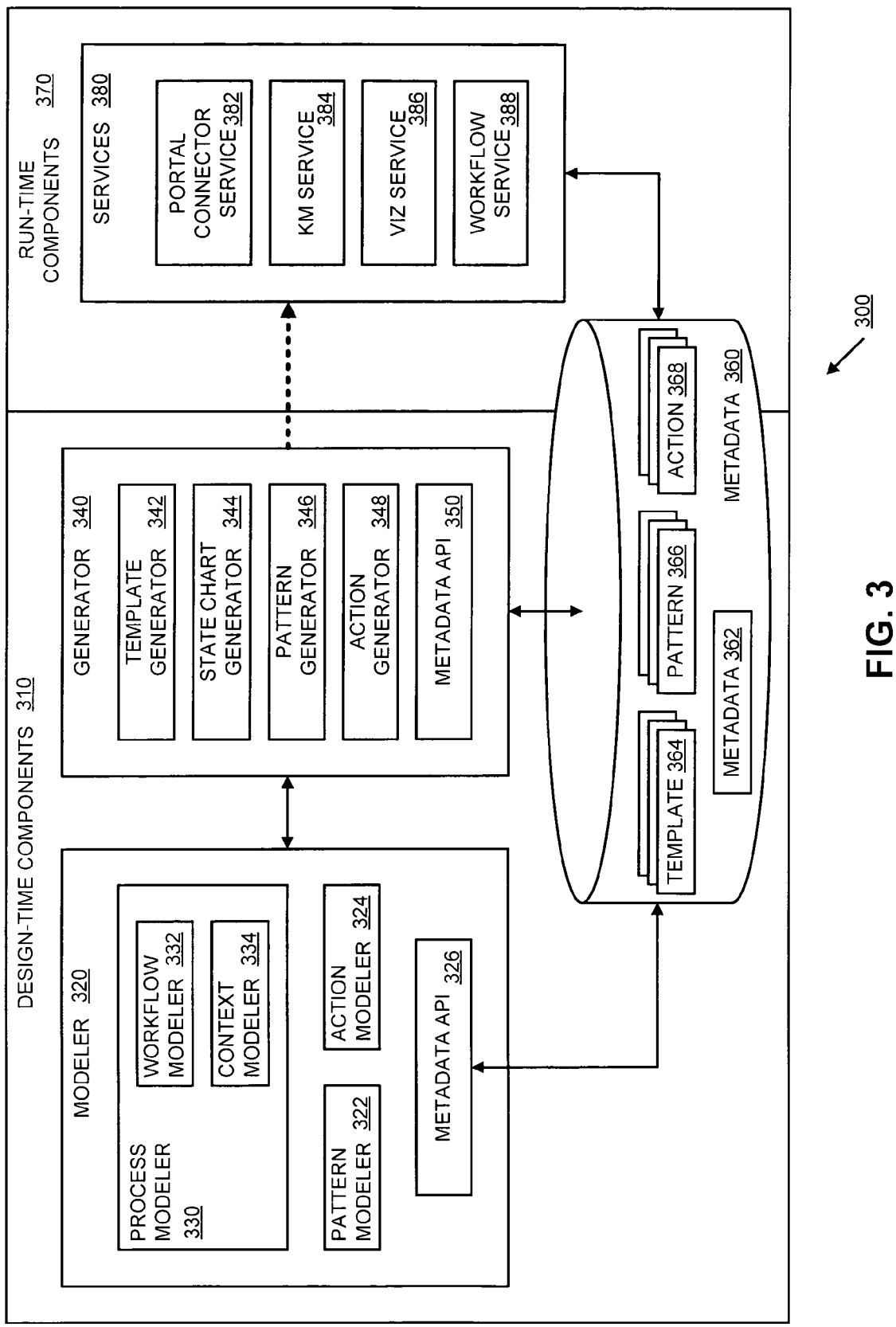
FIG. 3 is a block diagram of an embodiment of guided components for a composite application framework.

FIG. 3 is a block diagram of an embodiment of guided components for a composite application framework. As mentioned previously, a guided procedure is a series of operations/functions/performances, which may involve human interaction, which can be performed during the execution of a composite application. A guided procedure may be common to a variety of applications. Components 300 may be classified into design-time components 310 and run-time components 370. Metadata repository 360 may be part of and/or interact with both design-time components 310 and run-time components 370. Design-time components 310 may be used to generate run-time components 370. Design-time components 310, run-time components 370, and metadata repository 360 are examples of similarly-named components described previously.

Design-time components 310 include modeler 320 and generator 340. Modeler 320 includes process modeler 330, pattern modeler 322, and action modeler 324. Process modeler 330 includes workflow modeler 332 and context modeler 334. Workflow modeler 332 allows process workflow for a guided procedure to be modeled, and context modeler 334 provides context definition. That is, context modeler 334 allows relations between other processes to be defined. For example, an application may have more than one way of being activated, for example, Intranet Web-based form versus remote voice control. Context modeler 334 can provide for both activation mechanisms to be associated with the application. Pattern modeler 322 provides workflow patterns (e.g., delegation, approval) for workflow modeler 332, and action modeler 334 provides actions for workflows. Modeler 320 also includes a metadata API 326, which provides access to the data in metadata repository 360. Thus, access to metadata regarding guided procedures can be provided.

Generator 340 includes template generator 342, state chart generator 344, pattern generator 346, action generator 348, and metadata API 350. In one embodiment templates describe a workflow that may be may be implemented using workflow patterns. Workflow patterns may contain actions that define the workflow and therefore, part of the template. Thus, a pattern may be viewed as an abstraction of an action, and a template may be viewed as an abstraction of work flow pattern. For example, a template could describe a workflow for ordering a product (e.g., a computer). The template may specify a workflow pattern for obtaining manager approval. The pattern could have certain actions that need to be undertaken to complete the workflow. An example of an action could be finding the names of the employee's managers. The approval pattern, moreover, could be used for different templates.

Template generator 342 generates templates, state chart generator 344 generates state charts, pattern generator 346 generates patterns, and action generator 348 generates actions for the run-time environment. Metadata API 350 provides access to the metadata in metadata repository 360. Metadata repository 360 can include one or more templates 364, one or more workflow patterns 366, one or more actions 368, and/or other metadata 362. The templates, patterns, actions, and metadata may be accessed by generator 340 to produce a guide procedure. Other information may be found in metadata repository 360, and metadata repository 360 does not necessarily include all the items represented in the figure in all embodiments.

Run-time components 370 provide instantiation for guided procedures, producing instances of application portions. In one embodiment procedural navigation and integration may be provided in a Universal Worklist (UWL). Run-time components 370 may include various services, for example, portal connector service 382, KM service 384, visualization service 386, and/or workflow service 388. The services depicted in FIG. 3 are merely representative, and are not to be understood as necessary or restrictive of the type of services possible. For example, run-time components 370 could also include one or more of object access services, context sharing service, content services, and metadata services.

Object access services can allow objects in an object access layer to be accessed. Context sharing service can provide context to a workflow. For example, when a user accesses a workflow, a context sharing service can provide a link to the proper portions of the workflow. For instance, many workflows involve inboxes, where new tasks for the workflow may be sent. The inbox may provide a link to the proper portion of the workflow if the context is known. Content services can provide services for executing functions based on generic calls. For example, a workflow may need an application (e.g., a composite application, an HRM application, a CRM application) to be initiated. By making a generic call to content services, the application may be initiated. Content service may support integration with an application and/or a user interface.

Portal connector service 382 can provides a connection service to a portal. KM service 384 can provide a connection service to a KM module. Visualization service 386 can provide functionality to a visualization agent. For example, various combinations of visualization and/or other presentation of data may be possible based on a work mode of a user. In another example, information may be presented to a user to provide iconic views of one or more business processes, including status and structure. The manner in which the data and interaction of the various services for the user is made can be controlled/managed via one or more visualization services 386. Workflow service 388 can provide a connection service to an ad-hoc workflow. This workflow may be very user-centric, allowing the assignment of not only tasks handled by transactions in business systems, but also tasks that require user handling (e.g., compose e-mail).

Components 300 may have a variety of features. For example, the components may provide context mapping for building blocks, and a user profile may be automatically used and updated. In certain implementations, ad-hoc administrations of running workflows may be supported and guided procedures may be monitored and analyzed.

Figure 4:
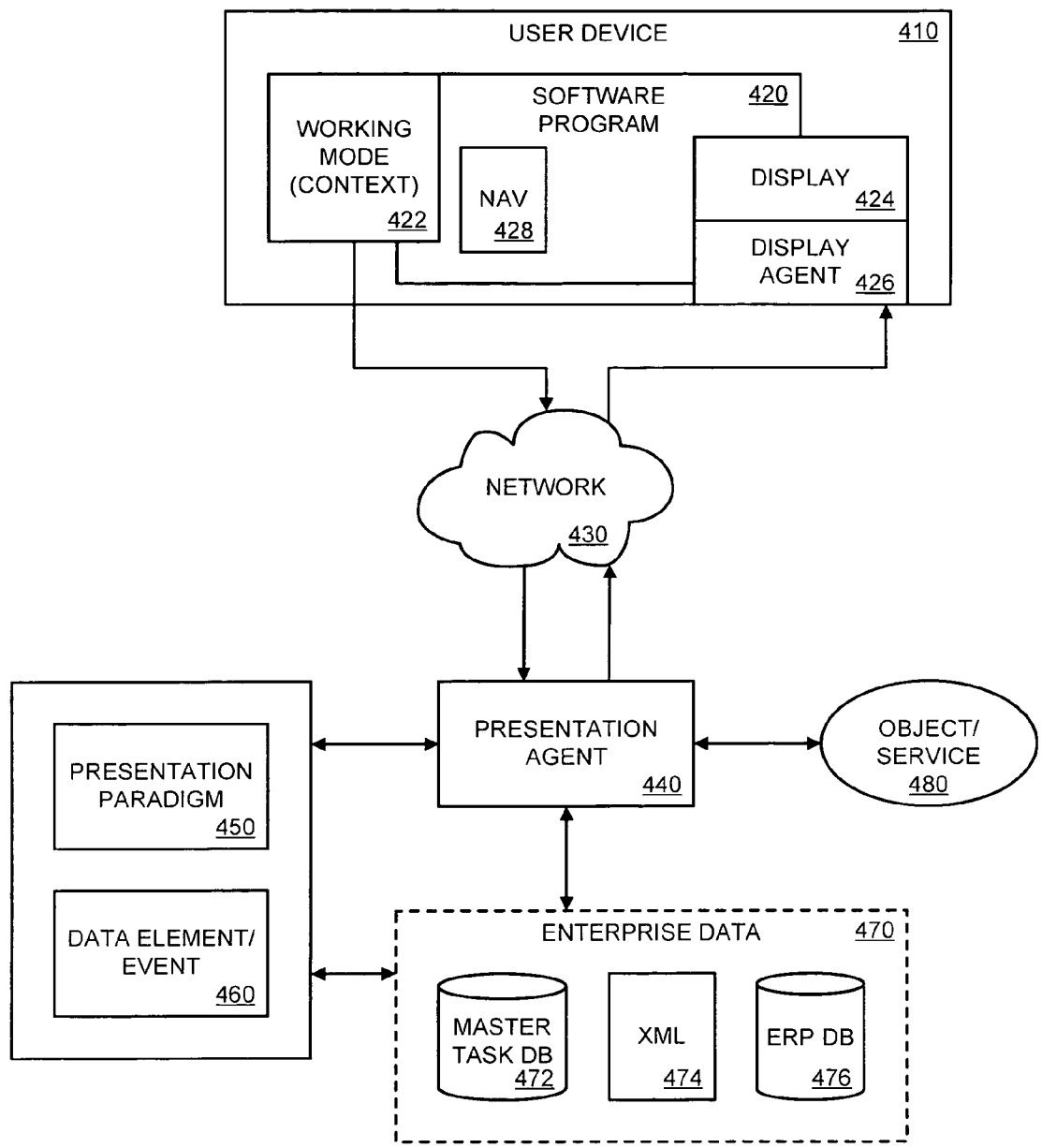
FIG. 4 is a block diagram of an embodiment of a system having a presentation agent.

FIG. 4 is a block diagram of an embodiment of a system having a presentation agent. User device 410 represents any number of devices that may be a client of an enterprise system. For example, user device 410 may be a laptop or desktop computer, a portable computing device, etc. User device 410 executes software program 420, which may be considered to be, or to provide a working environment or work context. The working environment or context is represented as working mode 422. Working mode 422 may include information about software program 420 or a document or process provided by software program 420. Working mode 422 may include any of the various working modes described above.

Software program 420 may also include one or more navigation methods (nav) 428, which represent any of the navigation mechanisms discussed above. Navigation method 428 may be provided from software program 420, from another program on user device 410, from a host operating environment (e.g., including an operating system) of user device 410, and/or may be provided over network 430 from the enterprise system. Navigation method 428 provides a manner of accessing processes, data, etc., from the enterprise.

User device 410 interconnects with the enterprise system via network 430, which represents interfaces, connection points, ports, etc., necessary to provide a connect from user device 410 to the enterprise system. Network 430 may include wired and/or wireless connections to user device 410. In one embodiment the enterprise system to which network 430 is connected is provided with the NETWEAVER platform available from SAP of Walldorf, Germany. In one embodiment the enterprise system issues a request to user device 410 to determine working mode 422. With knowledge of working mode 422, the enterprise system may provide a personalized working experience for a user.

The enterprise system may include presentation agent 440, which represents one or more components or modules (software and/or hardware) to provide the customized enterprise-level access to user device 410. In one embodiment presentation agent 440 is not a single entity (either software or hardware), but may represent several functions of various components and/or services of the enterprise system that provide the features of data navigation and presentation discussed herein. Presentation agent 440 may have, or access presentation paradigm 450 and/or data element/event 460.

Presentation paradigm 450 represents one of various manners/methods/forms of presenting data to user device 420, and may include any of the presentation paradigms discussed above. Presentation paradigm 450 may be associated with working mode 422, in that a particular working mode 422 may match a presentation paradigm 450 as determined by a developer of software program 420, a developer of the information/data to be presented, or preferences associated with a user of user device 410, or a combination of these. In an alternate embodiment presentation agent 440 determines a presentation paradigm 450 well-suited to presenting the information desired to present to user device 410.

Presentation agent 440 may include one or more functions to provide visualizations of enterprise data as described herein. Among possible functions are determining a user working mode, or work context, accessing data and/or events in the enterprise system, associating visualizations with data and/or events, including determining what thumbnails and/or color schemes with which to display information, and displaying the data.

Presentation agent 440 may access data element/event 460, which represents any of the data items discussed previously, and may be selected from among any data, object, process, project, etc., available within enterprise data 470. In one embodiment presentation agent 440 takes the data or event type into consideration in determining what presentation paradigm 450 to use to present data to user device 410. Thus, any combination of data and presentation paradigm and working mode may be possible, and the system can select particular combinations determined to be better suited to providing a useful working context to a user. In one embodiment presentation agent 440 takes into consideration navigation method 428 in determining what presentation paradigm 450 to use to present data to user device 410. Thus, any combination of the above may also be combined in any combination of navigation method to present data accessed by user device 410.

Presentation agent 440 may access enterprise data 470, which represents any information, process, or data available from the enterprise. Modem systems can allow enterprise data 470 to be seamlessly integrated despite actual, physical location of the data. For example, a company with locations in various countries may have information available from multiple locations throughout the world, which are all available to user device 410 without regard to physical location of the data or the user device. Additionally, enterprise data 470 may include data external to a particular enterprise (e.g., a trading partner). In one embodiment enterprise data 470 includes one or more of master task database 472, which provides information regarding one or more projects, XML source 474, which could represent dynamically generated information, and/or enterprise resource programming (ERP) database 476, which represents any data that may be considered part of a data store of information used in coordinating or working on enterprise-level processes or projects.

In one embodiment presentation agent 440 may access one or more objects 480, which represent elements of an enterprise system that enable the integration of enterprise data 470 and/or the interconnection with user device 410 and/or provide features to enable presentation agent 440 to provide combinations of presentation methods with methods and conditions of access to data. The methods of access may include the navigation methods, and the conditions of access may include the working mode. In one embodiment object 480 represents one or more JAVA beans of the enterprise system. In one embodiment presentation agent 440 is one or more object 480 of the enterprise system.

Presentation agent 440 may include hardware, software, and/or a combination of these. In a case where agent 440 includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

Figure 5:
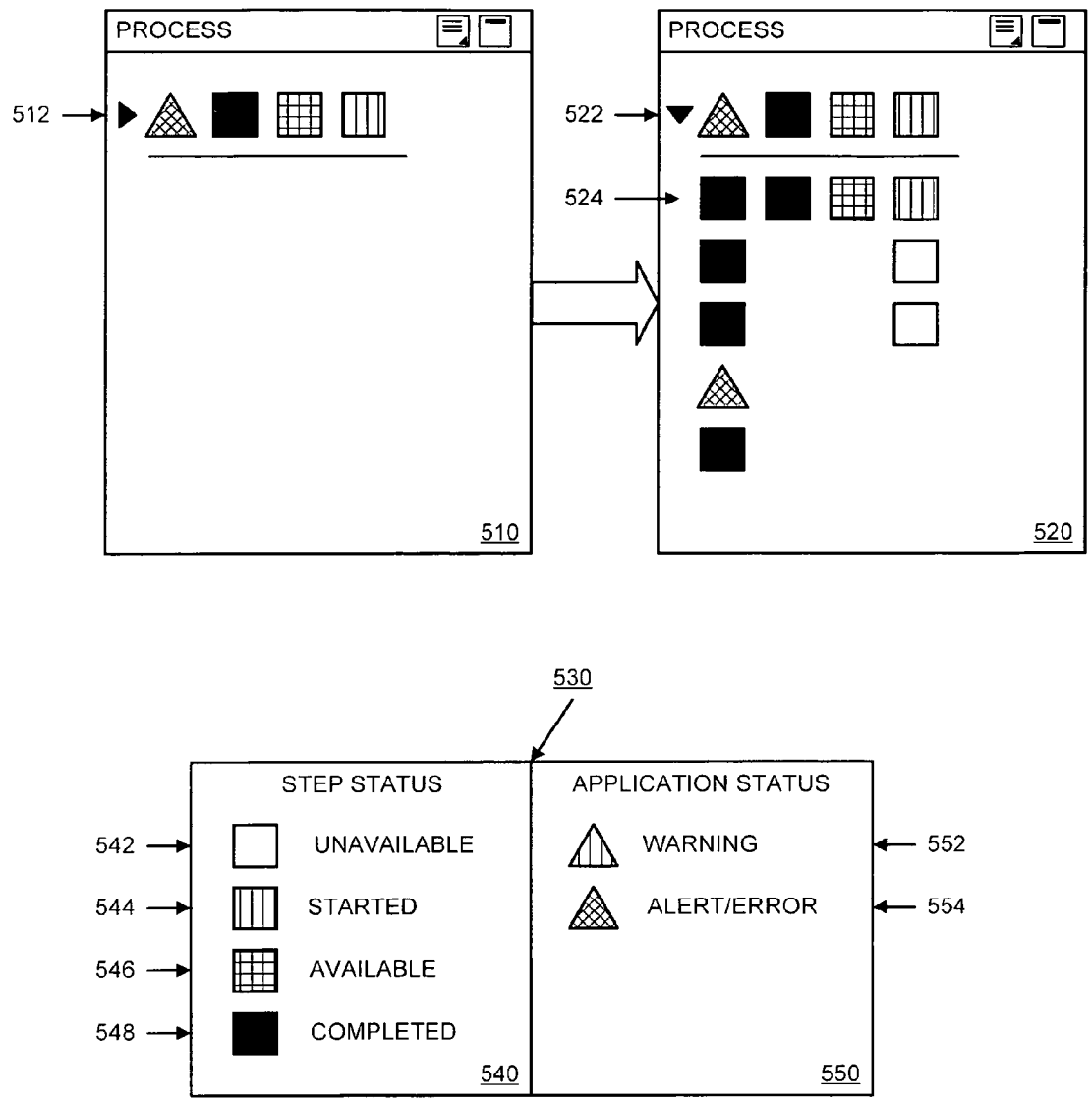
FIG. 5 is a block diagram of an embodiment of a thumbnail representation of a process.

FIG. 5 is a block diagram of an embodiment of a thumbnail representation of a process. Process 510 represents process of a process-driven enterprise environment, as described above. Process 510 can be a business process that includes various phases, represented by icons or thumbnails 512. Thumbnails 512 provide an overview of the structure of process 510. In one embodiment each thumbnail 512 is selected or generated to provide information about process 510. For example, thumbnails 512 may be of a particular graphical representation, a textual representation or phase name, etc. In one embodiment process 510 can be defined structurally in terms of various departments, working groups, etc., that may need to provide work to complete process 510. Each department or work group may have an individual icon that could be presented to indicate the various phases of process 510.

In one embodiment each thumbnail 512 is described by a legend 530 that indicates meaning of the various symbols used as thumbnails 512. For example, as depicted in FIG. 5, each thumbnail 512 may have a particular color, which represents a state of the thumbnail. Additionally, thumbnails 512 may have differing shapes to indicate other information. As a simple example, legend 530 includes step or phase status indicators 540, with colors/representations 542-548, and application status indicators 550, with colors/representations 552-554. In one embodiment step status 540 indicates what state the phase currently has, whereas application status 550 may be used to indicate important information about execution of the phase.

For example, color 542 could represent a status of unavailable, color 544 a status of started, color 546 a status of available, and color 548 a status of completed. The different status types are illustrative only, and other status types could be used, for example, levels of completion (e.g., percentage), abandoned or obviated, etc. The status types could vary based on implementation, enterprise, department, team, or the imagination of the user.

A status of unavailable may indicate that the project phase is not ready to begin work. For example, the phase may not have an assignment, or may have an assignment, but the project is on hold until some event occurs. Events could be the passage of time, the completion of other tasks, etc. A status of started may indicate that the phase is being worked on. The phase being worked on may indicate that actual work is being done, plans are in place, assignments are made, individuals are assigned to a team, etc. A status of available may indicate that the phase may be worked on. For example, in one embodiment many of the possibilities mentioned for the status of started may apply instead to the status of available. A status of completed may indicate that no more work is required on the phase. The meaning of the possible states described herein is somewhat arbitrary, because the description of phases is implementation specific.

Similarly, the use of squares for step status, and triangles for application status 550 is arbitrary. Application status 550 is shown to include color 552 to indicate a warning, and color 554 to indicate an alert or error. In one embodiment a warning could include an indication that a phase is behind schedule, or over-budget, a team-member is no longer available (e.g., moved to another project, out on vacation, terminated, etc.), etc. An alert or error may indicate a condition that should be addressed to allow the process to proceed. For example, perhaps critical parts have been discontinued by a supplier, or a budget committee decided to remove funding, etc.

The various elements of legend 530 provide a simple and quick visual representation of the phases of process 510. In one embodiment process 510 and/or one or more of its phases can be expanded to indicate details regarding the expanded phase/process. In FIG. 5, process 520 represents process 510 in an expanded view. Thumbnails 522 are indicated with the "thumbnail arrow" now pointing down, to indicate the expanded view. Such a thumbnail arrow technique is common in computer programming, although it is not essential. The phases represented by thumbnails 522 are seen to have various steps or tasks 524 associated with each phase. In the embodiment shown, each task 524 is indicated by a similar icon from legend 530, although in other embodiments a different presentation mechanism could be used. For example, different icons and/or colors could be used to represent tasks 524 of the phases represented by thumbnails 522.

The expansion of the view of the first thumbnail provides the information that an alert or error is reported in the fourth step of the first phase, while all other steps are already completed. The information provided by such a drill-down could quickly provide a significant amount of information to a project manager or administrator. Thus, the view allows for the overview of structure and status of a process, with the ability to drill down to obtain more information.

The collection of steps or phases presented by colored thumbnail shapes 522 can be navigable, as discussed further below. Briefly, a user may expand a thumbnail 522 by a "mouse over" of the step for display, by clicking on the step with a cursor, etc. The action of expanding the thumbnail may cause an actual navigation within the step, by virtue of a tiered navigation method, for example, those discussed above. In addition to actual navigation, or instead of actual navigation, mousing-over the step or otherwise selecting/activating the thumbnail could provide additional information (e.g., step name, scheduled start/completion dates, budget, project leader, etc.).

Figure 6:
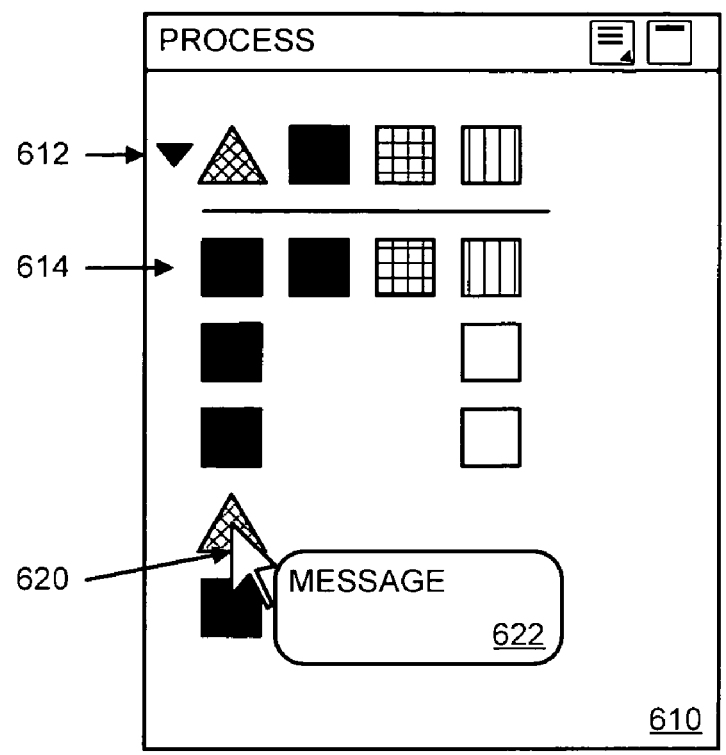
FIG. 6 is a block diagram of an embodiment of an interaction with a thumbnail representation of a process.
Figure 6:
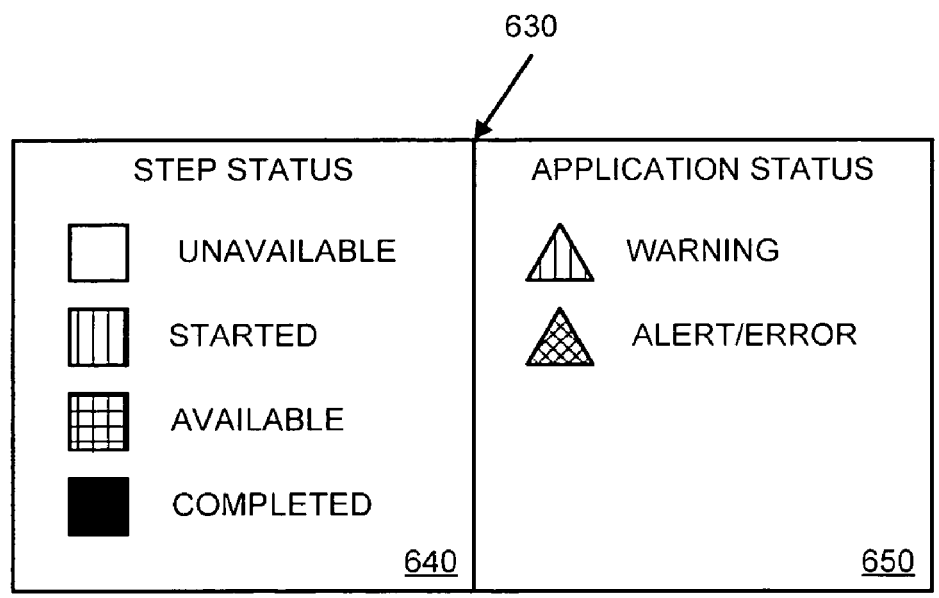

FIG. 6 is a block diagram of an embodiment of an interaction with a thumbnail representation of a process. Process 610 may be a process according to process 510 of FIG. 5 or other processes described above. Legend 630 can provide information about the thumbnails to inform an observing user of what information is being displayed with relation to process 610, for example, step status 640 or application status 650. In FIG. 6, process 610 is shown expanded, with thumbnails 612 each having associated expanded information icons 614 in view. In one embodiment expanded information icons 614 includes links to particular steps or tasks of each of the phases represented by thumbnails 612. Icons 614 can be understood as being other visual representations in addition to thumbnails 612, as well as in one embodiment, being textual representations of information and/or links.

In one embodiment a drill-down functionality of the visualization of process 610 includes an ability of a user to move pointer 620 (e.g., a mouse pointer or other cursor control) over one of the icons 614. A mouse-over of an icon 614 could trigger/prompt the visualization of process 610 to provide more information with relation to the selected icon. In one embodiment a selection of the icon occurs via a mouse click, or other known methods of object/text selection and/or hyperlinking. The further trigger could provide further information, for example, message 622. Message 622 may indicate any information with regard to the particular task of the particular phase selected, as determined from enterprise data associated with process 610. The enterprise data could be obtained in response to the selection of the icon, or the information could be cached or otherwise locally available from a previous recent access to the enterprise data. To provide a user with current information for real-time presentation of process information, the access to enterprise data can be made to be reasonably close to the selection of the icon by the user. Certain time limits and/or safeguards can be programmed into a visualization system, as would be understood by those skilled in the art.

Figure 7:
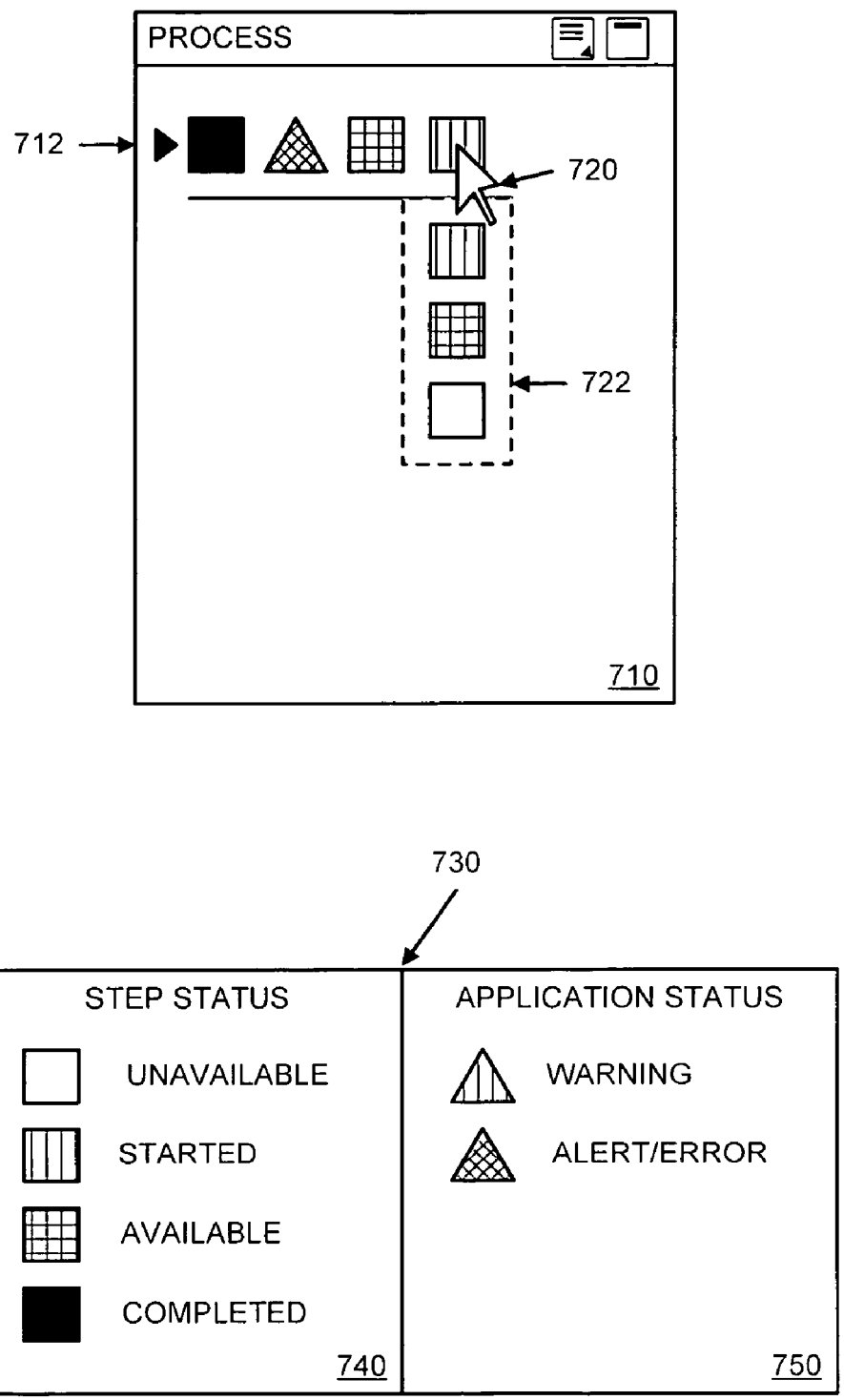
FIG. 7 is a block diagram of an embodiment of an interaction with a thumbnail representation of a process.

FIG. 7 is a block diagram of an embodiment of an interaction with a thumbnail representation of a process. Process 710 may represent a process according to any shown and/or otherwise discussed previously. In one embodiment the details of any particular thumbnail 712 are viewable/expandable only upon expansion of the entire process 710, meaning all thumbnails 712. In another embodiment, individual thumbnails 712 are expandable separately from the others, for example, by selection and/or mouse-over. Thus, in one embodiment a user pauses pointer 720 over a thumbnail 712 to trigger display 722 of the specific tasks associated with the selected thumbnail.

Legend 730, including step status 740 and application status 750 could provide information about the icons/text used to display information regarding process 710.

Figure 8:
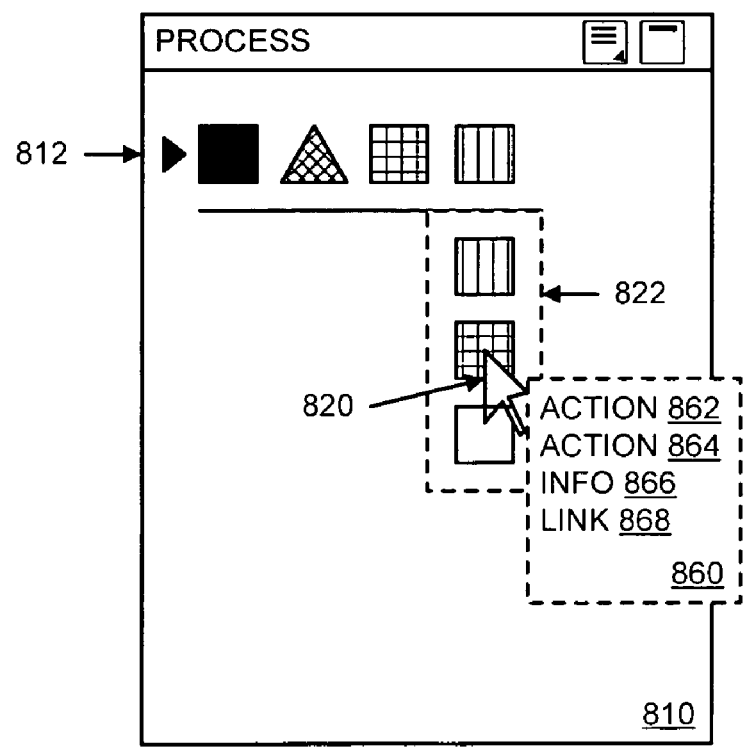
FIG. 8 is a block diagram of an embodiment of an interaction with a thumbnail representation of a process.
Figure 8:
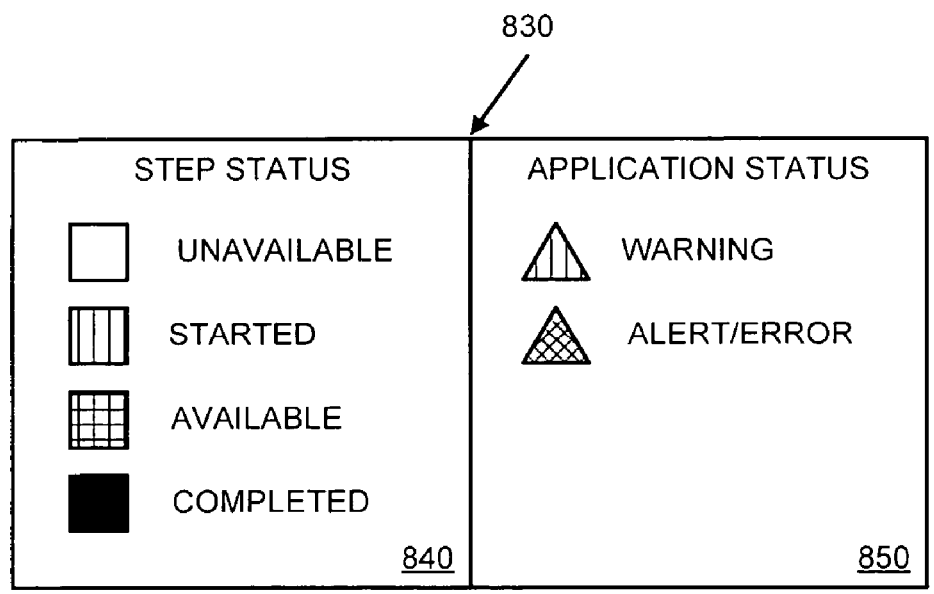

FIG. 8 is a block diagram of an embodiment of an interaction with a thumbnail representation of a process. Process 810 may represent a process according to any shown and/or otherwise discussed previously. In one embodiment an individual thumbnail 812 of process 810 is expanded, separately from the other thumbnails 812. Expanding the individual thumbnail can trigger the visualization to display tasks 822 associated with the expanded thumbnail. In one embodiment, further, more detailed information may be obtainable from the visualization of process 810. For example, mousing-over or selecting a particular task of tasks 822 may expand the individual task to display additional information, links, enterprise objects, etc., which may be collectively referred to as associated items for purposes of discussion here.

For example, the selected task may have associated actions 862 and 864, which are displayed upon selection of the task. The display could be in the form of a pop-up box or window. Actions 862 and 864 may represent functions that will be brought up upon selection from the list of associated items. The associated items may be in a list form, as shown in FIG. 8, and may also be icons shown in a relatedness pattern, etc. The associated items may include text and/or visual representations, and/or actionable boxes (for example, filling in information that will become part of the enterprise data for the task). The associated items may include actions, which may represent a business object, and/or may include links to other information or related objects, and/or additional information/messages to be displayed.

Legend 830, including step status 840 and application status 850 could provide information about the icons/text used to display information regarding process 810.

Figure 9:
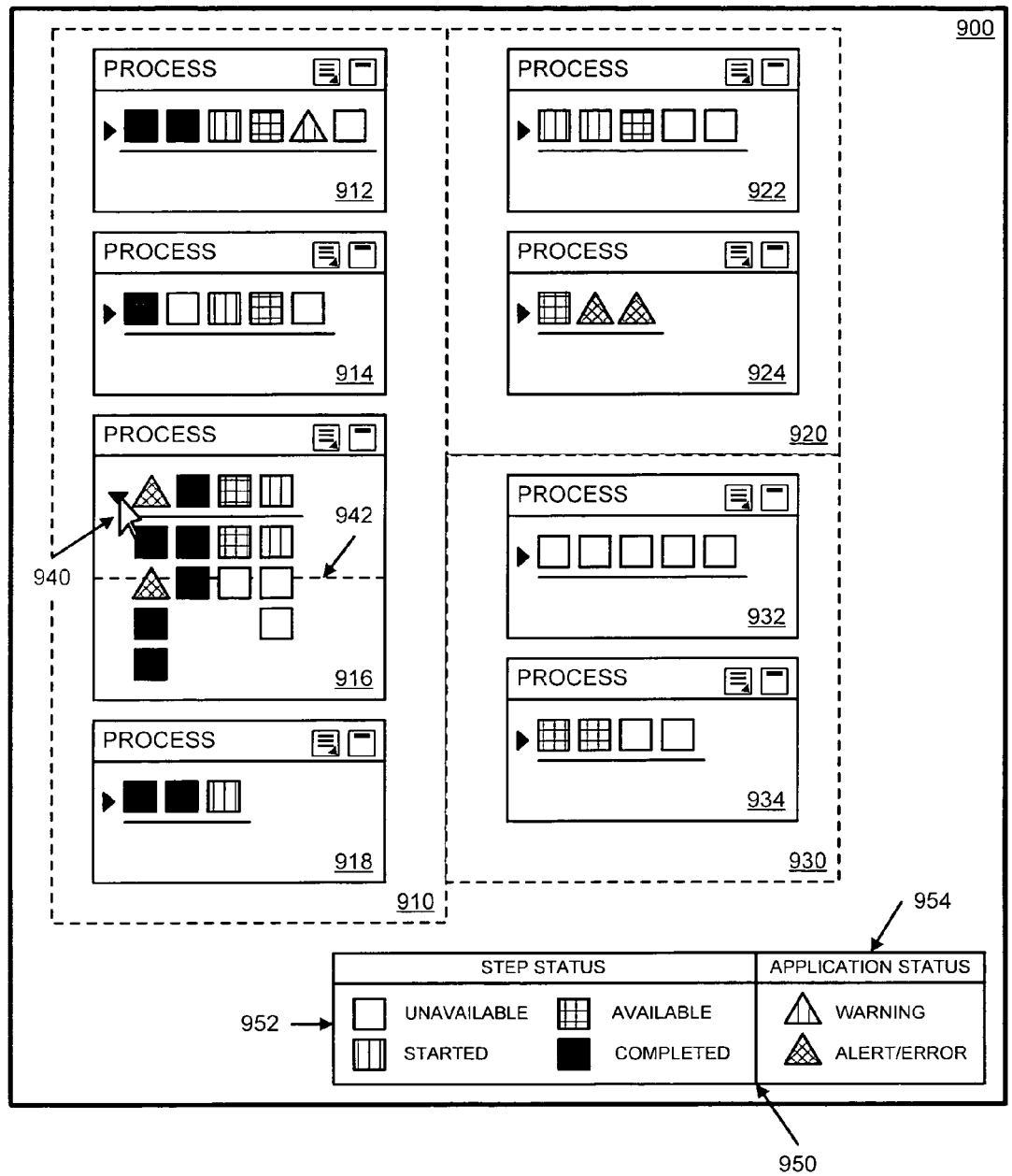
FIG. 9 is a block diagram of an embodiment of a visualization of a comparison of processes.

FIG. 9 is a block diagram of an embodiment of a visualization of a comparison of processes. User display 900 may represent all or part of a user display, for example, a screen or window of a user's video display, a panel of a program, etc. In one embodiment display 900 is part of a cockpit view generated in response to a user's credentials and viewing preferences.

A visualization of various processes may be generated in user display 900. In one embodiment a visualization engine or agent accesses enterprise data to determine associations of processes to display. For example, a user may wish to see current or planned processes grouped by relatedness of tasks (e.g., hiring needs for various positions within the corporation), by relatedness of business focus (e.g., processes associated with corporate acquisition), by temporal relatedness (e.g., processes designated to be completed in Q2), or any other form of grouping. The visualization agent can determine such information from the enterprise data, and may provide is based on the credentials of a user or a program being called by a user.

In one embodiment process groups 910, 920, and 930 are grouped according to user viewing preferences. Each process group provides displays of structure and status of one or more processes, and provides interactive interfaces to enable the user to extract information from the visual display of the processes and juxtaposition of the processes and process groups. In one possible example, process groups 910, 920, and 930 represent, respectively, processes to be completed in successive business quarters. Process group 910 includes processes 912, 914, 916, and 918. Process group 920 includes processes 922 and 924, and process group 930 includes processes 932 and 934.

In one embodiment each process 912-918, 922-924, and 932-934 is selectively actionable as described in FIGS. 5-8, and all principles discussed with respect to those processes could apply to these processes of FIG. 9. In one embodiment a user can expand process 916 by action with pointer 940. Process 916 is represented with dashed line 942 to indicate that the layout and display of process 916 changed when the user expanded process 916. For example, process 916 could have appeared the same in format as the other processes, until expanded. The display of information in user display 900 may thus be dynamic to depict information desired by the user in an interactive way with respect to the real-time presentation of enterprise-level data. Display 900 may include legend 950, which may include step status indicators 952 and application status indicators 954 to provide context for the information being presented to the user.

The juxtaposition of processes in display 900 can provide information comparison to enable a user to quickly visually assess the overall structure and status of various processes currently in operation. In one embodiment the layout or organization of the displays, with the various phases of each process, as well as the various phases, can provide a color or other visual distribution to provide process information to a user.

Figure 10:
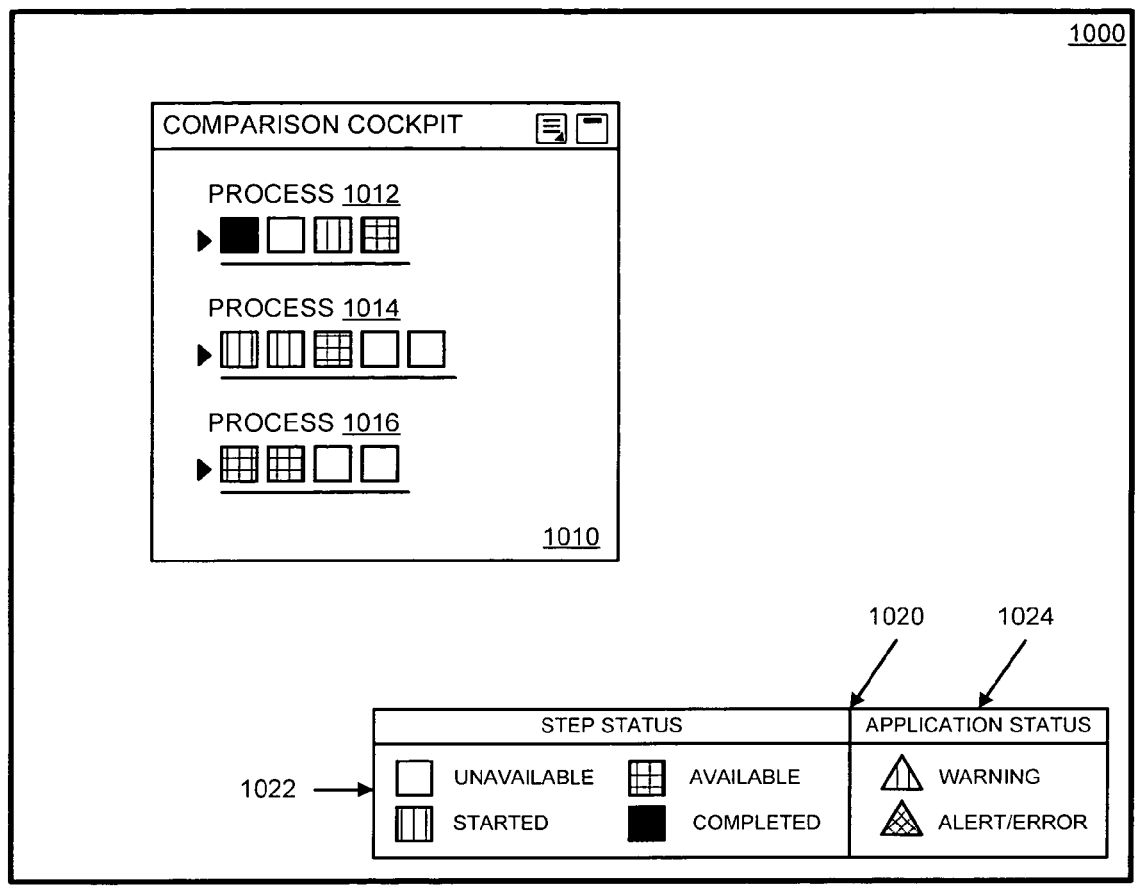
FIG. 10 is a block diagram of an embodiment of a visualization of a comparison of processes.

FIG. 10 is a block diagram of an embodiment of a visualization of a comparison of processes. Display 1000 may be a representation of a display according to display 900 of FIG. 9. In one embodiment, instead of, or in addition to the process comparison of FIG. 9, the visualization agent may provide comparison cockpit 1010 to present information regarding various processes. In one embodiment display 900 of FIG. 9 is one embodiment of comparison cockpit 1100.

Comparison cockpit 1010 may provide a mechanism with which to provide detailed information regarding processes 1012-1016. Processes 1012-1016 can be processes according to any discussed previously, and all methods of process navigation and information presentation discussed previously can apply to each process individually, or multiples of the processes collectively. Display 1000 may include legend 1020, which may include step status indicators 1022 and application status indicators 1024 to provide context for the information being presented to the user.

Figure 11:
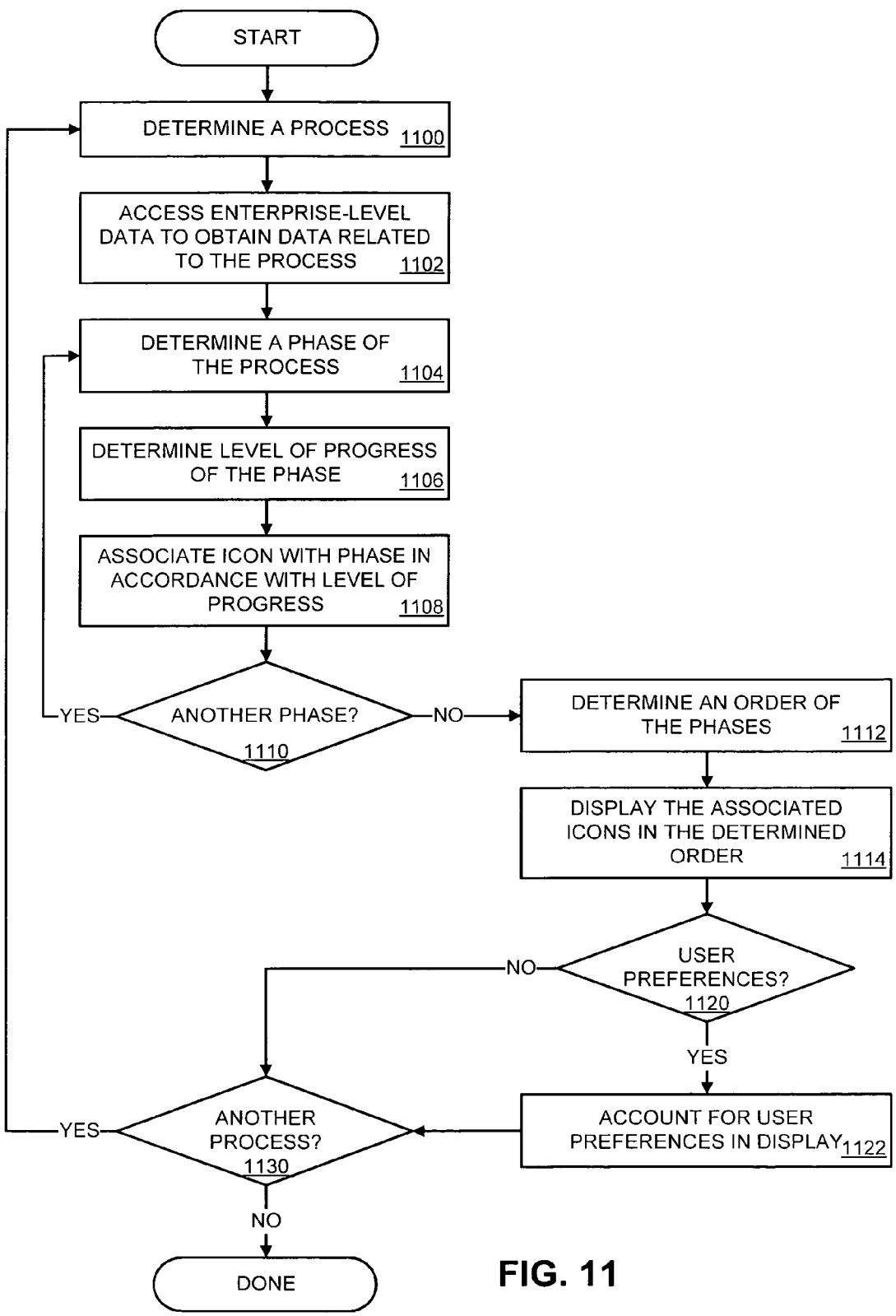
FIG. 11 is a flow diagram of an embodiment of providing a thumbnail representation of processes.

FIG. 11 is a flow diagram of an embodiment of providing a thumbnail representation of processes. In one embodiment a visualization agent provides the functionality associated with the various operations shown in FIG. 11. A visualization agent is described above. In one embodiment the agent determines a process from enterprise data, 1100. The process may be selected based on user preferences, user credentials, or both. For example, the agent may provide a view of one or more processes to a manager that is in charge of multiple processes. The process may be determined automatically or in response to a user action.

The agent accesses enterprise data to obtain data related to the process, 1102. In one embodiment at least some related information is obtained in conjunction with determining and selecting the process. The agent can determine a phase or step of the process based on the enterprise data, 1104. The phase or step represents a group of tasks/actions to be performed to complete the process. The agent may determine a level of progress of the phase, 1106. The level of progress may be a level of completion, a stage of development of the phase, a state of the phase of the project, etc. The agent may associate an icon or thumbnail with the phase of the process in accordance with the determined level of progress, 1108. For example, different visualizations may be used to represent different levels of progress, such as color, icon type, and/or positioning/organization of the icons.

The agent may determine if there are other phases to display, 1110. In one embodiment all phases of a process will be displayed. In one embodiment only selected phases of a process may be relevant to a particular view, as set out in user display preferences, for example. For example, in a comparison of multiple processes, perhaps only a select few of the phases of a process are to be displayed to compare against related phases of other processes. In another embodiment, a user may desire a high-level task summary, and be interested only in seeing phases of a project that are at a particular level of progress. If other phases are to be displayed, the operations explained before are repeated for the relevant phases.

If no other phases are to be displayed, the agent may determine an order or an organization associated with the phases, 1112. The order may represent a structure of the phases. Thus, when multiple phases are displayed in the determined order, they may collectively provide a structural overview of the process. The agent can then display the icons representing the various phases in the determined order to provide a visualization of the structure and status or state of the steps of the process to a user, 1114.

The agent may determine if there are user preferences relevant to the display of enterprise-level data, specifically, the phases in their determined order, 1120. The user preferences may be applied to the displayed information to account for the user preferences in displaying the data. The application of the user preferences may occur as part of the rendering of display data to a video renderer. The application of the user preferences may likewise provide modifications to a standard display, for example, by either providing additional information for display or removing information from display. The accessing of user preferences may be performed prior to the determination of the initial process. In one embodiment the application of user preferences is performed to result in less or more information being accessed after the initial process is determined. Thus, the operation of determining and applying user preferences is not to be understood as necessarily occurring in the order depicted in FIG. 11.

In one embodiment a display will include multiple processes for comparison. Thus, the agent may determine if there are additional processes for display, 1130. If there are more processes to display, the entire visualization procedure may be repeated for each process. In one embodiment the operation of determining if there are additional processes includes the agent determining whether there are other processes related to the initial process to be displayed, or related to the process display paradigm selected (e.g., a paradigm of displaying all active processes due to be completed in the next month). In one embodiment the determination of whether to display additional processes is related to the use of a process comparison cockpit.

Figure 12:
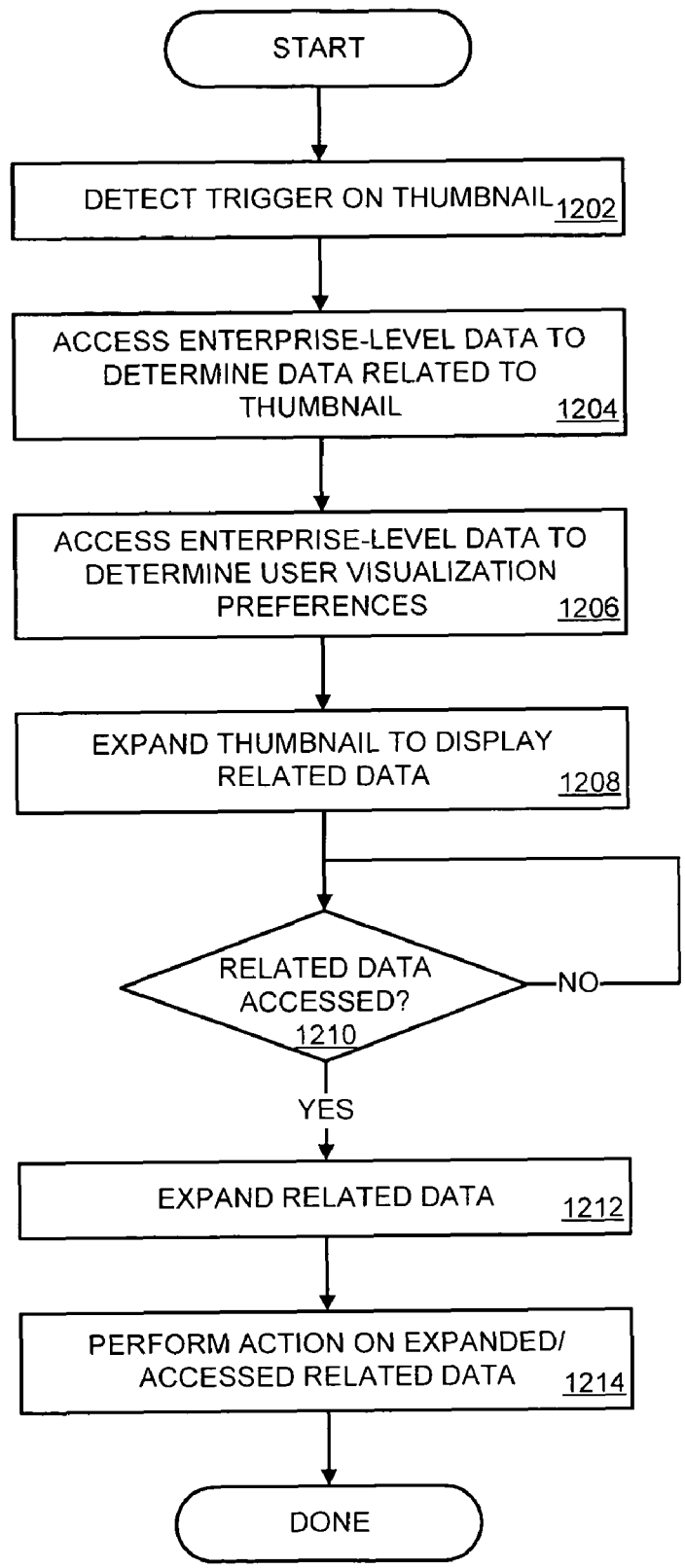
FIG. 12 is a flow diagram of an embodiment of providing interaction with a thumbnail representation of processes.

FIG. 12 is a flow diagram of an embodiment of providing interaction with a thumbnail representation of processes. In one embodiment all operations are performed by a visualization agent. A trigger can be detected on a thumbnail of a process display, 1202. The trigger can be detected by the agent that provided the visualization including the thumbnail, or it may be detected as a standard function of a computer program within an environment (e.g., a right-click in a WINDOWS environment may evoke certain standard function calls. The trigger can be through any mechanism discussed above, including, but not limited to, a pointer selection mechanism (e.g., a right-button mouse click, a left-button mouse click, a mouse-over).

The agent may access enterprise data to determine data related to the thumbnail, 1204. The access of the data may occur in response to the triggering of the thumbnail, or alternatively, prior to the triggering of the thumbnail. If the data is accessed prior to the triggering of the thumbnail, the data may be retrieved when the trigger occurs. The agent may also retrieve user preferences with respect to the display of information, 1206. These user preferences may determine how and what information is displayed.

In response to triggering the thumbnail, the agent may expand the view of the thumbnail to display additional information, 1208, for example, the related information. The related information may include object links, action links, messages, document links, application links, or any other information or task related to the thumbnail. The extent to which any information is displayed may be constrained or otherwise affected by the user preferences, as mentioned above.

In one embodiment the related data may also be expanded to provide additional, more detailed information. In such an embodiment the agent may determine if the related data is accessed, 1210. If the related data is accessed, the related data may be expanded, 1212, in a similar fashion as the thumbnail is expanded to display the related data. In one embodiment expanding the related data provides other options for a user to select, which options may then be selected and actions performed on the expanded/accessed related data, 1214. In an alternate embodiment the expanding of the related data may trigger the performance of one or more actions in relation to the related data.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method of presenting runtime structure and state information associated with a composite application executing in an enterprise environment, the method comprising:

accessing enterprise server data from a server of an enterprise system, wherein the enterprise server data corresponds to a plurality of runtime business processes of the composite application and describes a structure and status for multiple business process phases within each of the plurality of runtime business process, and wherein one or more of the runtime business processes include a guided procedure service having a logical flow of the multiple business process phases associated with the guided procedure service including a chronological order of business process phases for the guided procedure service, and a level of progress of the business process phases for the guided procedure service, and wherein the guided procedure service specifies one or more human interactions to be performed and completed in fulfillment of the guided procedure service; and generating and rendering a display interface based on credentials and viewing preferences of a user of the composite application, wherein generating and rendering the display interface comprises:

generating a cockpit view of the composite application wherein the cockpit view comprises a thumbnail representation for each of the plurality of runtime business processes within the composite application;

generating the contents of each of the plurality of thumbnail representations for the cockpit view of the composite application, wherein generating the contents of each of the plurality of thumbnail representations comprises:

generating a process phase status icon for each of the multiple business process phases of the respective runtime business process, wherein each phase status icon to graphically represent business process phase within the respective thumbnail representation and to graphically indicate a status of the business process phase within the respective thumbnail representation, and generating a minimized view of an actual instance of the respective runtime business process within the composite application to which the thumbnail representation of the cockpit view corresponds including a real-time presentation of enterprise-level data associated with the respective runtime business process to which the thumbnail representation of the cockpit view corresponds, and displaying each of the plurality of thumbnail representations for the cockpit view of the composite application.

2. A method according to claim 1, wherein each phase status icon graphically indicates the status of a respective business process phase via a particular color.

3. A method according to claim 1, wherein the business process phase status comprises a level of development of the business process phase towards completion of the business process phase.

4. A method according to claim 1, wherein the business process phase status comprises an indication of a threshold task to be addressed prior to completion of the business process phase.

5. A method according to claim 4, wherein the threshold task comprises resolving an error condition.

6. A method according to claim 1, further comprising:
expanding a business process phase status icon to display specific applications of the business process phase.

7. A method according to claim 6, wherein expanding the business process phase status icon comprises displaying the specific applications of the business process phase in response to a mouse-over of the business process phase status icon by the user.

8. A method according to claim 6, wherein expanding the business process phase status icon comprises displaying the specific applications of the business process phase in response to a cursor click by the user.

9. A method according to claim 6, wherein expanding the business process phase status icon comprises displaying the specific applications of the business process phase in response to a user activating an icon to expand the business process.

10. A method according to claim 6, further comprising:
expanding the composite application to display application-specific data.

11. A method according to claim 10, wherein expanding the composite application comprises showing a link to an enterprise-level object related to the composite application.

12. A method according to claim 10, wherein expanding the composite application comprises showing information related to the composite application.

13. A method according to claim 10, wherein expanding the composite application comprises showing a link to a task related to the composite application.

14. An article of manufacture comprising a machine-accessible storage medium having content stored thereon to provide instructions to result in a machine performing operations including:
accessing enterprise server data from a server of an enterprise system, wherein the enterprise server data corresponds to a plurality of runtime business processes of a composite application and describes a structure and status for multiple business process phases within each of the plurality of runtime business process, and wherein one or more of the runtime business processes include a guided procedure service having a logical flow of the multiple business process phases associated with the guided procedure service including a chronological order of business process phases for the guided procedure service, and a level of progress of the business process phases for the guided procedure service, and wherein the guided procedure service specifies one or more human interactions to be performed and completed in fulfillment of the guided procedure service; and
generating and rendering a display interface based on credentials and viewing preferences of a user of the composite application, wherein generating and rendering the display interface comprises:
generating a cockpit view of the composite application wherein the cockpit view comprises a thumbnail representation for each of the plurality of runtime business processes within the composite application;
generating the contents of each of the plurality of thumbnail representations for the cockpit view of the composite application, wherein generating the contents of each of the plurality of thumbnail representations comprises:
generating a process phase status icon for each of the multiple business process phases of the respective runtime business process, wherein each phase status icon to graphically represent business process phase within the respective thumbnail representation and to graphically indicate a status of the business process phase within the respective thumbnail representation, and
generating a minimized view of an actual instance of the respective runtime business process within the composite application to which the thumbnail representation of the cockpit view corresponds including a real-time presentation of enterprise-level data associated with the respective runtime business process to which the thumbnail representation of the cockpit view corresponds, and
displaying each of the plurality of thumbnail representations for the cockpit view of the composite application.

15. An article of manufacture according to claim 14, wherein each phase status icon to indicate graphically the status of the respective business process phase via a particular color.

16. An article of manufacture according to claim 14, wherein the business process phase status comprises one or more of a degree of completion of the business process phase or an error condition associated with the business process phase.

17. An article of manufacture according to claim 14, further comprising the content to provide instructions to result in the machine performing operations including:
expanding a thumbnail to display a business process task associated with the business process phase.

18. An article of manufacture according to claim 17, further comprising the content to provide instructions to result in the machine performing operations including:
expanding the business process task to display one or more of a link to an enterprise-level object related to the task, enterprise-level data associated with the task, or a link to an action related to the task.

19. An apparatus comprising:
a memory having instructions stored thereon to cause the apparatus to perform operations including:
accessing enterprise server data from a server of an enterprise system, wherein the enterprise server data corresponds to a plurality of runtime business processes of a composite application and describes a structure and status for multiple business process phases within each of the plurality of runtime business process, and wherein one or more of the runtime business processes include a guided procedure service having a logical flow of the multiple business process phases associated with the guided procedure service including a chronological order of business process phases for the guided procedure service, and a level of progress of the business process phases for the guided procedure service, and wherein the guided procedure service specifies one or more human interactions to be performed and completed in fulfillment of the guided procedure service; and
generating and rendering a display interface based on credentials and viewing preferences of a user of the composite application, wherein generating and rendering the display interface comprises:
generating a cockpit view of the composite application wherein the cockpit view comprises a thumbnail representation for each of the plurality of runtime business processes within the composite application;
generating the contents of each of the plurality of thumbnail representations for the cockpit view of the composite application, wherein generating the contents of each of the plurality of thumbnail representations comprises:
generating a process phase status icon for each of the multiple business process phases of the respective runtime business process, wherein each phase status icon to graphically represent business process phase within the respective thumbnail representation and to graphically indicate a status of the business process phase within the respective thumbnail representation, and generating a minimized view of an actual instance of the respective runtime business process within the composite application to which the thumbnail representation of the cockpit view corresponds including a real-time presentation of enterprise-level data associated with the respective runtime business process to which the thumbnail representation of the cockpit view corresponds, and displaying each of the plurality of thumbnail representations for the cockpit view of the composite application; and a processor coupled to the memory to execute the instructions on the memory.

20. An apparatus according to claim 19, wherein each phase status icon to indicate graphically the status of the respective business process phase via a particular color associated with a level of progress of the business process phase.

21. An apparatus according to claim 19, the memory further having instructions to cause the apparatus to perform operations including:

expanding the status icon to display a business process task associated with the business process phase.

22. An apparatus according to claim 21, the memory further having instructions to cause the apparatus to perform operations including:

expanding the business process task to display one or more of a link to an enterprise-level object related to the task, enterprise-level data associated with the task, or a link to an action related to the task.

23. A method according to claim 1, further comprising graphically indicating the status of all business process phases of a respective runtime business process by providing a color distribution to represent the overall state of the respective runtime business process.

24. A method according to claim 1, further comprising graphically indicating the status of all business process phases of a respective runtime business process by generating the process phase status icons to have a particular shape associated with a level of progress of the business process phase.

* * * * *